(12) United States Patent
Layne et al.

(10) Patent No.: US 7,308,979 B1
(45) Date of Patent: *Dec. 18, 2007

(54) SELF-TENSIONING CONVEYOR WITH SLAVE DRIVE

(75) Inventors: James L. Layne, Bowling Green, KY (US); Michael D. McDaniel, Glasgow, KY (US); Stephen C. Fye, Glasgow, KY (US); B. Keith Thomas, Cave City, KY (US); Lewis W. Ward, Glasgow, KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/991,273

(22) Filed: Nov. 17, 2004

Related U.S. Application Data

(63) Continuation-in-part of application No. 10/731,954, filed on Dec. 10, 2003, now Pat. No. 6,959,803.

(60) Provisional application No. 60/509,999, filed on Oct. 8, 2003, provisional application No. 60/435,221, filed on Dec. 18, 2002.

(51) Int. Cl.
*B65G 37/00* (2006.01)
(52) U.S. Cl. ..................................... 198/600
(58) Field of Classification Search ................ 198/600, 198/606, 841, 860.1
See application file for complete search history.

(56) References Cited

U.S. PATENT DOCUMENTS 1,748,301 A   2/1930   McKinlay
1,776,419 A   9/1930   Dodge
1,877,194 A   9/1932   Nyborg et al.
1,944,296 A   1/1934   Nyborg
2,413,339 A   12/1946  Stadelman
2,504,948 A   4/1950   Ferguson
2,583,471 A * 1/1952   Collis .......................... 198/835
2,624,444 A   1/1953   Casabona
2,639,802 A   5/1953   Duncan
2,680,509 A   6/1954   Kandra et al.
3,370,693 A * 2/1968   Marsden ................... 198/460.2
3,628,834 A * 12/1971  Anderson .................... 305/159
3,701,413 A   10/1972  Leahy et al.
3,743,078 A   7/1973   Pittoreau (Continued)

FOREIGN PATENT DOCUMENTS

EP        0146496      6/1985

(Continued)

*Primary Examiner*—Mark A Deuble
(74) *Attorney, Agent, or Firm*—King & Schickli, PLLC

(57) ABSTRACT

A conveyor for possible use in transferring articles between two adjacent conveyors is disclosed. In one embodiment, the conveyor includes a pair of idler structures and a drive structure for collectively guiding and moving a conveyor belt or chain relative to a bed. At least one of the drive structure or idler structures is mounted or positioned so at to be capable of moving relative to the belt or chain to provide tensioning therefor. In another embodiment, a bed assembly including the chain or belt, the drive structure, and the idler structure is also substantially fully releasable from a corresponding base for servicing or clearing a jam. In either case, the conveyor may be driven using a slave drive associated with an adjacent conveyor.

20 Claims, 20 Drawing Sheets

U.S. PATENT DOCUMENTS

| | | |
|---|---|---|
| 3,773,167 A | 11/1973 | McGinnis |
| 3,878,937 A | 4/1975 | Glaser |
| 4,142,625 A | 3/1979 | Bourgeois |
| 4,394,901 A * | 7/1983 | Roinestad .................... 198/850 |
| 4,733,768 A * | 3/1988 | Aquino et al. ........... 198/369.2 |
| 4,925,009 A * | 5/1990 | Hill ............................ 198/583 |
| 4,938,336 A | 7/1990 | Aquino et al. |
| 5,044,485 A | 9/1991 | Loder |
| 5,096,045 A | 3/1992 | Feldl |
| 5,156,260 A | 10/1992 | Dorner |
| 5,203,447 A | 4/1993 | Ewert |
| 5,456,349 A | 10/1995 | Axmann |
| 5,497,747 A * | 3/1996 | Nakano et al. ............. 123/363 |
| 5,562,199 A | 10/1996 | Fisher |
| 5,562,200 A * | 10/1996 | Daringer .................. 198/844.2 |
| 5,584,373 A | 12/1996 | Layne |
| 5,605,222 A | 2/1997 | Huberty et al. |
| 5,609,238 A * | 3/1997 | Christensen ................ 198/583 |
| 5,695,042 A | 12/1997 | van der Burgt et al. |
| 5,749,454 A | 5/1998 | Layne |
| 5,871,085 A | 2/1999 | Yagi |
| 5,938,006 A | 8/1999 | Fisher |
| 5,967,296 A | 10/1999 | Dolan |
| 6,109,427 A | 8/2000 | Hosch et al. |
| 6,164,435 A * | 12/2000 | Coen et al. .................. 198/600 |
| 6,318,545 B1 | 11/2001 | Ross, II |
| 6,481,567 B2 | 11/2002 | Layne et al. |
| 6,705,433 B2 * | 3/2004 | McQuaid et al. .............. 186/68 |
| 6,749,191 B2 * | 6/2004 | Pellegrin et al. ................ 271/2 |
| 6,959,803 B1 * | 11/2005 | Layne et al. ................. 198/600 |
| 2003/0183493 A1 * | 10/2003 | Ertel et al. .................. 198/841 |
| 2005/0067262 A1 * | 3/2005 | Layne et al. ................ 198/851 |

FOREIGN PATENT DOCUMENTS

| | | |
|---|---|---|
| GB | 555216 | 8/1943 |
| GB | 982495 | 2/1965 |
| GB | 2273692 | 6/1994 |
| SU | 1288130 | 2/1987 |
| SU | 1402513 | 6/1988 |

* cited by examiner

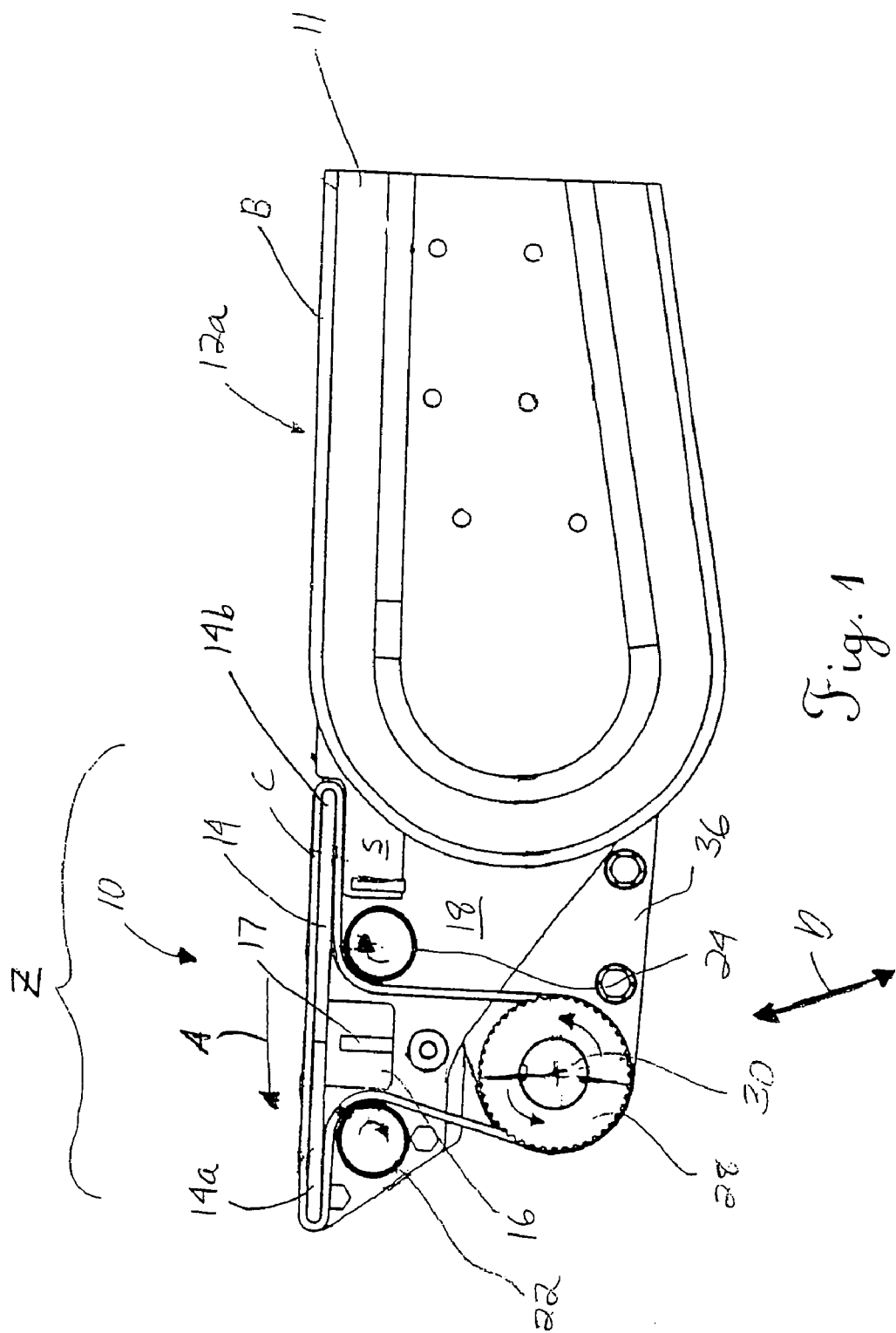

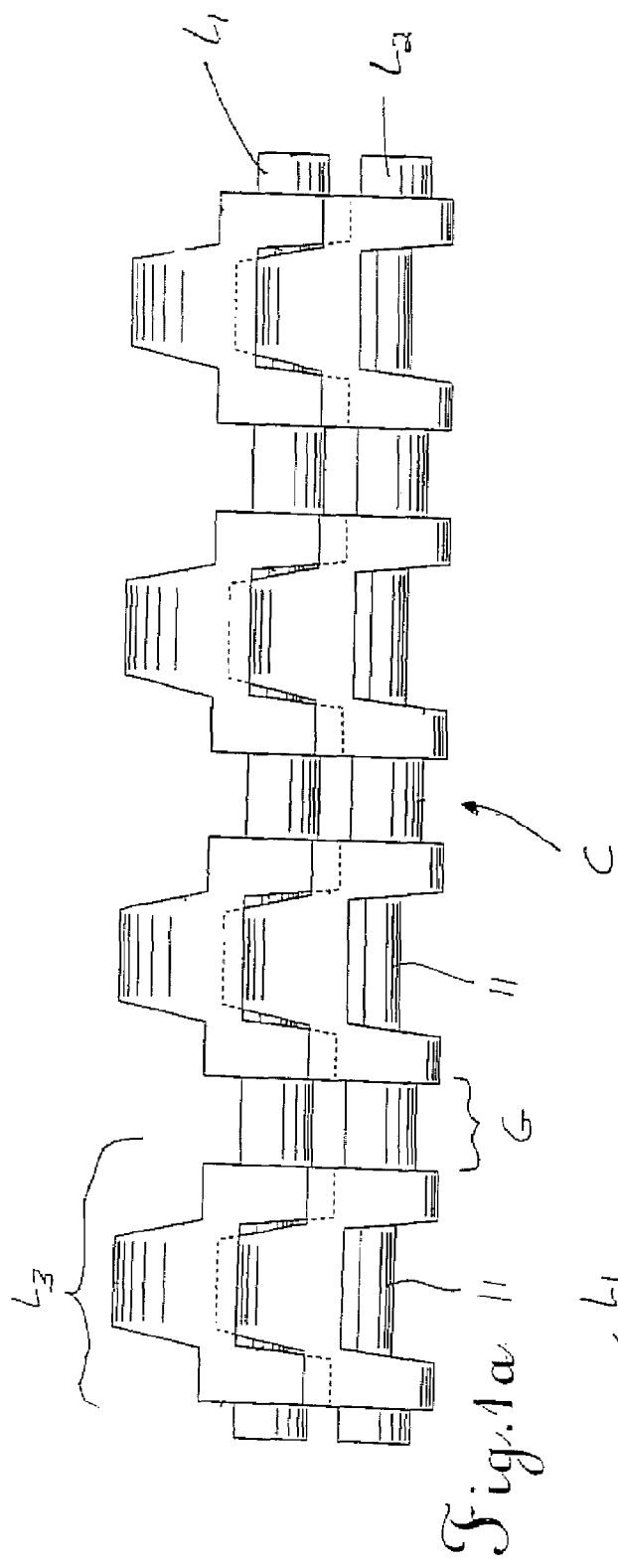
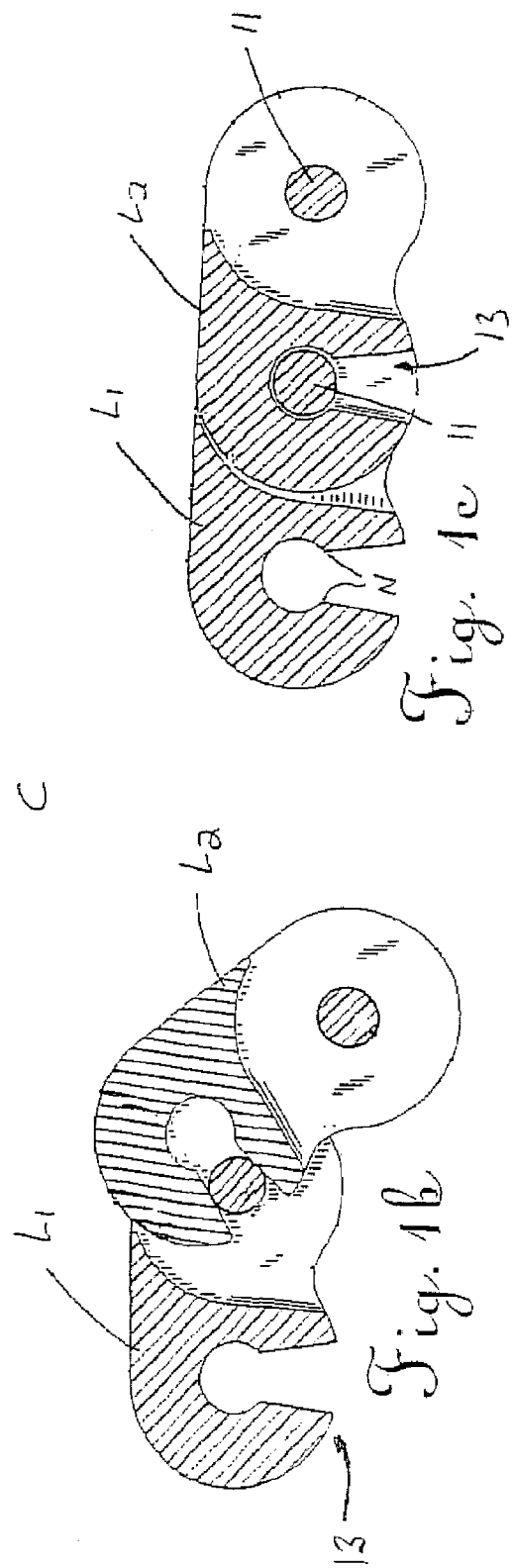

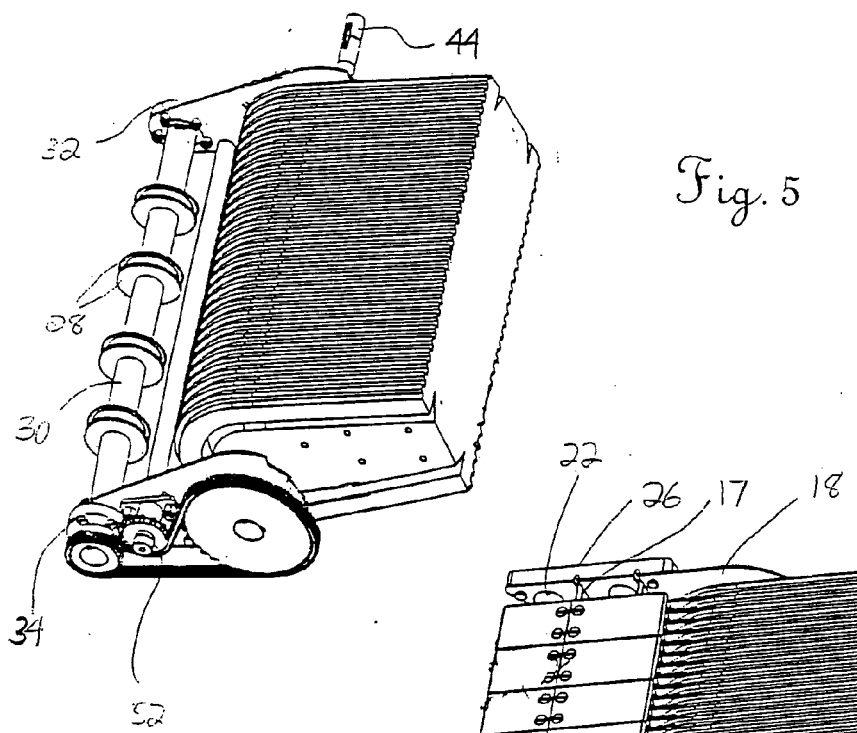
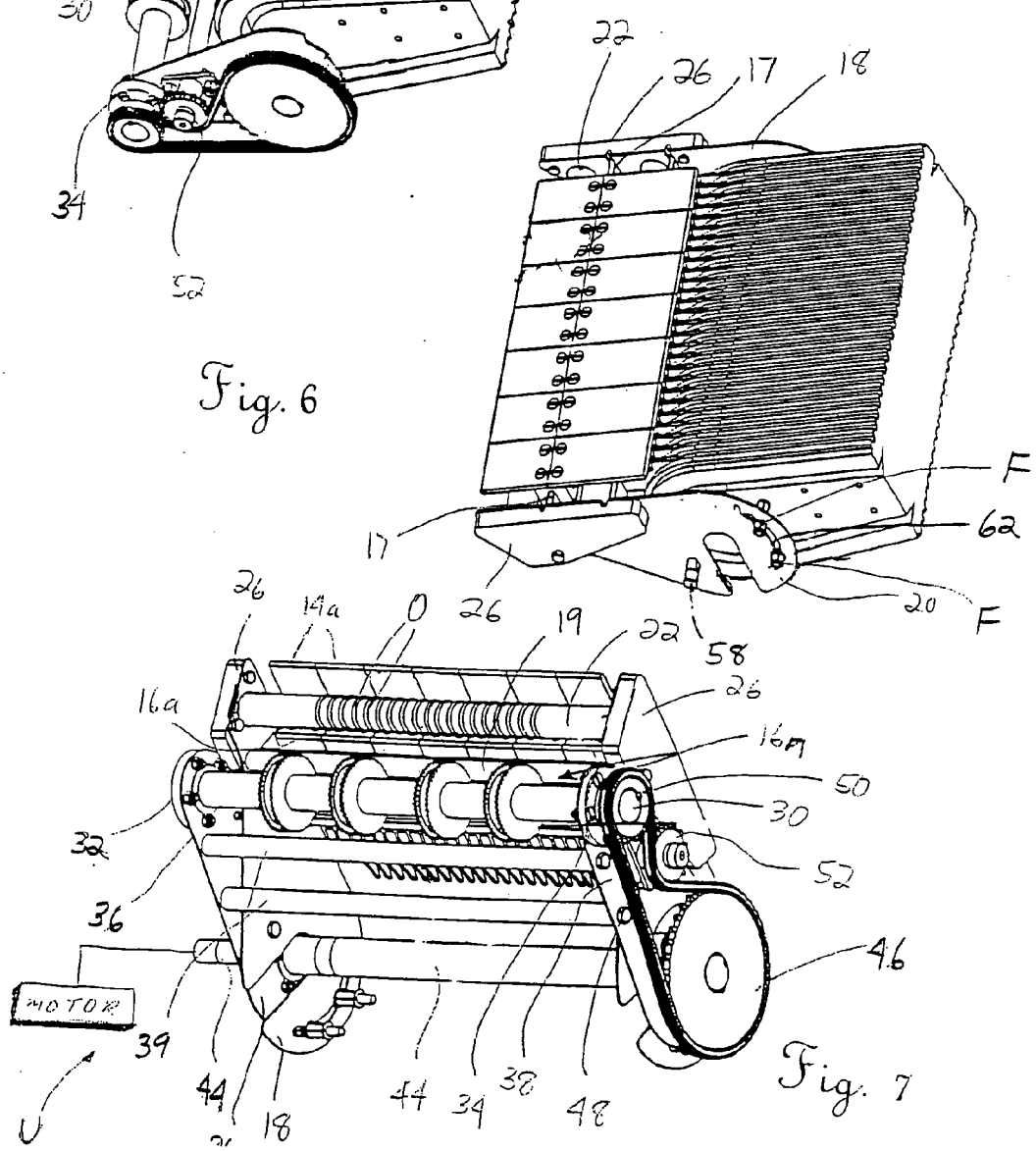

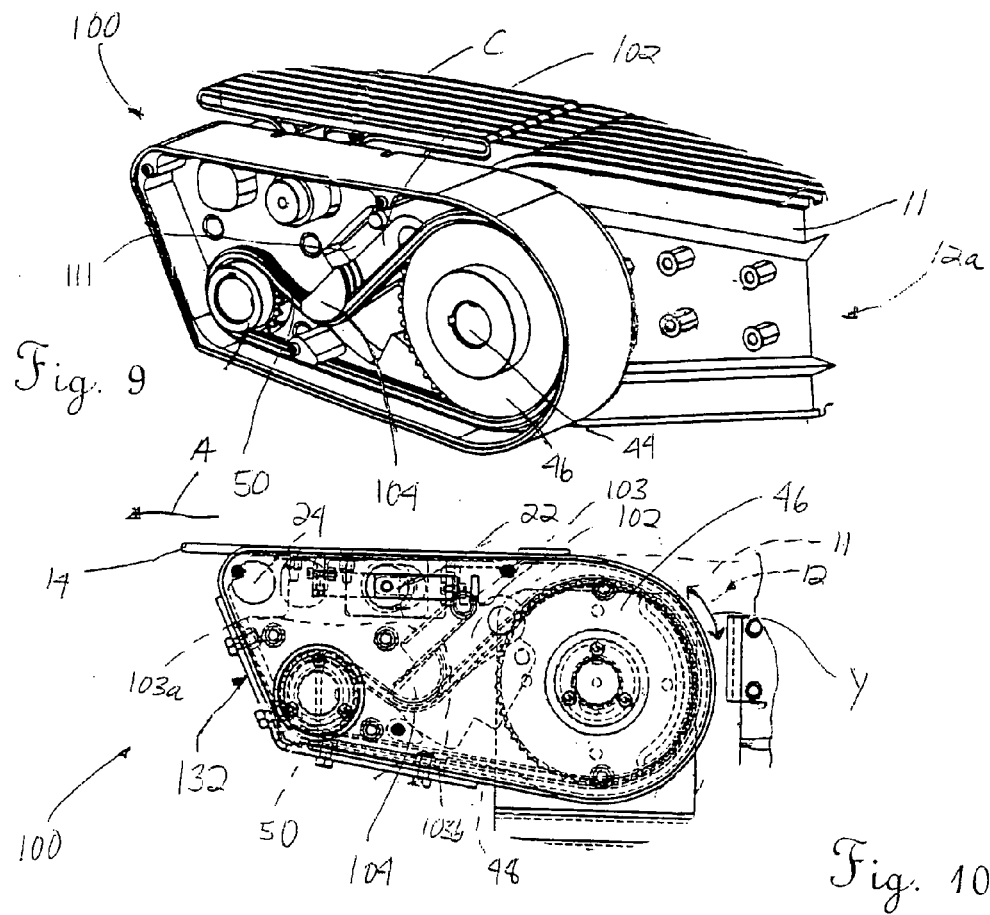
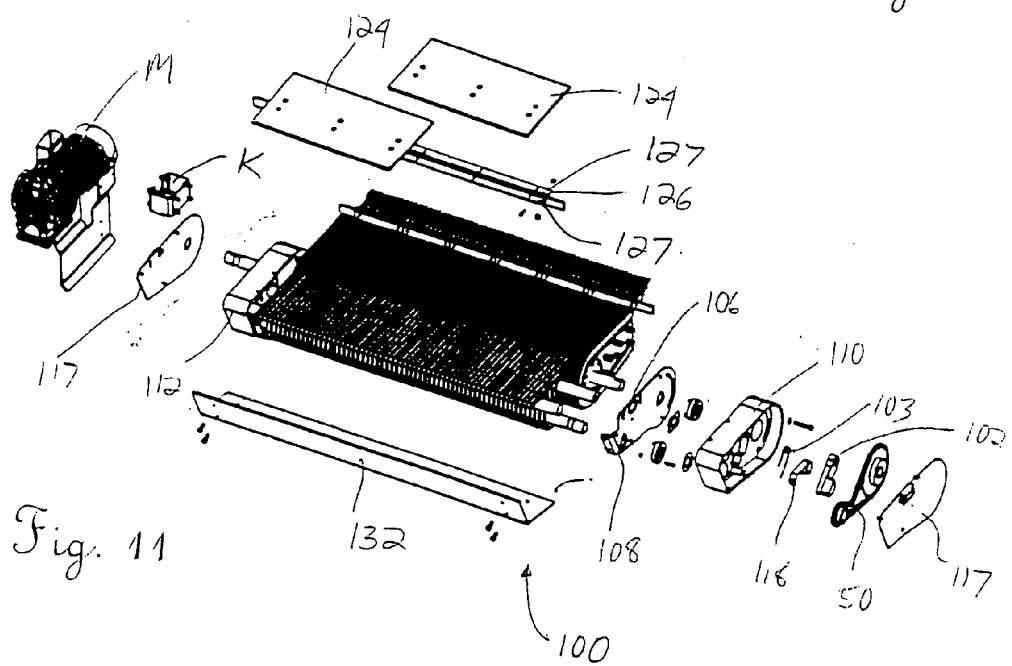

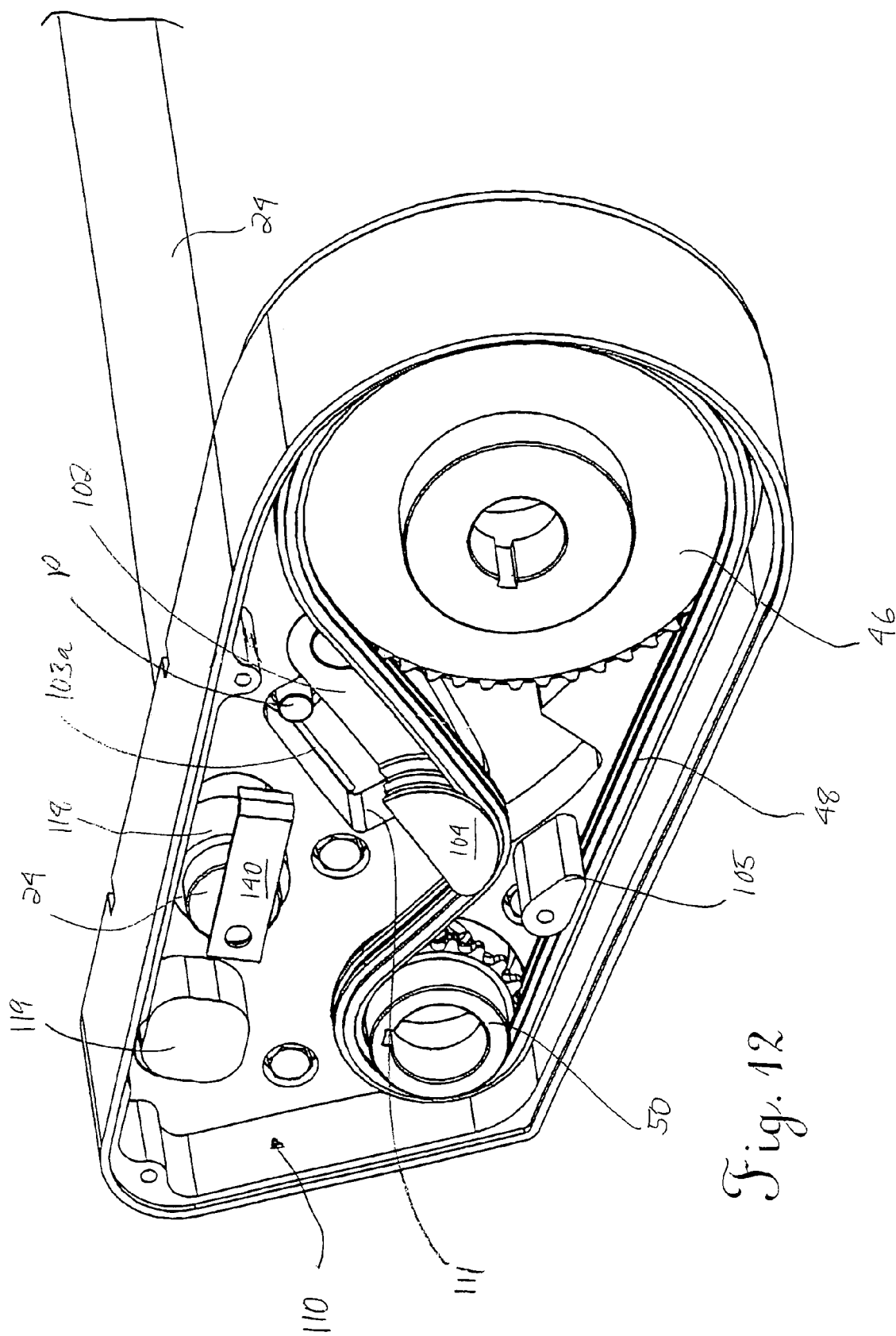

SELF-TENSIONING CONVEYOR WITH SLAVE DRIVE

This application is a continuation-in-part of U.S. patent application Ser. No. 10/731,954 filed Dec. 10, 2003, now U.S. Pat. No. 6,959,803, the disclosure of which is incorporated herein by reference. U.S. patent application Ser. No. 10/731,954 claims the benefit of U.S. Provisional Patent Application Ser. Nos. 60/435,221, filed Dec. 18, 2002 and 60/509,999, filed Oct. 8, 2003.

TECHNICAL FIELD

The present invention relates to the conveyor art and, more particularly, to a slave-driven transfer conveyor.

BACKGROUND OF THE INVENTION

Today, many modern manufacturing facilities extensively utilize modular conveyor systems to transport articles to and from various work stations during all stages of production. In recent years, manufacturers using production lines with conveyors as an integral component of the material handling system have realized reasonably significant gains in productivity and resource utilization. As a result, modular conveyor systems have become even more widely implemented and have been adapted to meet an even wider scope of the material handling needs of producers of a multitude of consumer and industrial goods. Therefore, the continual development of improved modular conveyors is necessary to keep pace with the demands and expectations of the users of such conveyors.

Conventional conveyor systems employing endless, modular link belts or chains are typically driven at one end of an elongated guide structure, frame or "bed" supported above the ground. The force for driving the belt or chain is transmitted from a motive device, such as a variable speed electric motor, to a rotating drum or a plurality of gang-driven sprockets coupled to a rotating drive structure, such as a shaft. At the opposite end of the guide structure or bed, idler sprockets are coupled to a freely-rotating idler shaft or drum. As should be appreciated, these structures assist in supporting and guiding the endless belt or chain as it makes the transition from the forward run to the return run, or vice versa, at each respective end of the guide structure. Intermediate drive units, including frictional drives, may also be used in place of or in addition to the end drive unit.

Oftentimes, a plurality of laterally repeating modular links, or unitary link sections comprising a plurality of laterally repeating link-shaped structures (collectively referred to as "links"), form the conveyor chain or belt. The links are typically formed of a low-cost, high strength, wear resistant material, such as Acetal or UHMW polypropylene. To form the chain or belt, a plurality of links or link sections are positioned in interdigitating, longitudinally repeating rows. Each row is then connected to the adjacent row by a transverse connecting rod that projects through one or more apertures in a first, usually leading portion of a first link or link section and one or more apertures or slots in a second, or trailing portion of the next-adjacent link or link section. At both lateral ends of each row, special side links are used that include slots for receiving a locking structure, such as a tab, that retains the transverse connector rod in place. Examples of this type of arrangement are found in commonly assigned U.S. Pat. Nos. 4,953,693 and 5,031,757, the disclosures of which are incorporated herein by reference. Due to their low-cost, adaptability and long service life, chains or belts formed in this fashion have gained widespread acceptance among those seeking conveying solutions.

In the past, others have recognized the potential value of a "micropitch" chain formed of a plurality of interconnected links, but capable of behaving almost like it is formed of a continuous piece of material, such as a belt formed of a piece of rubber or fabric. An example is found in U.S. Pat. No. 5,967,296 to Dolan, which discloses a belt including a plurality of link sections including laterally and longitudinally offset spherical beads having apertures for receiving a plastic transverse connector rod. Once inserted through the aligned apertures in a pair of interdigitated link sections, both ends of the connector rod are mutilated, such as by melting. This captures the rod in place between the link sections to form a belt section. One improved version of a micropitch chain that advantageously avoids the need for separate connector rods is found in Applicant's co-pending application Ser. No. PCT US03105666, published as WO03072464, and having entered the U.S. national stage as U.S. patent application Ser. No. 10/505,943 (published as U.S. Patent Application Publication No US2005067262), which is incorporated herein by reference.

Modular conveyor systems often include two or more conveyors strategically positioned in an end-to-end relationship so as to move articles along a feed path in a conveying direction. This type of arrangement is especially beneficial in the food processing or packaging industries, and where space availability is sometimes limited. However, a prevalent problem with such an end-to-end conveyor system is the lack of a compact, driven transfer conveyor including a belt or chain that efficiently and effectively provides for the smooth transition of articles along a transfer zone established between the ends of the adjacent conveyors.

Accordingly, a need is identified for an improved conveyor that may be used for efficiently and effectively conveying articles, including between the ends of two adjacent conveyors at a transfer location.

SUMMARY OF THE INVENTION

In accordance with a first aspect of the invention, a conveyor for positioning in the gap between one end of a first conveyor having a drive unit and an adjacent end of a second conveyor is disclosed. The conveyor comprises an endless conveyor belt, a frame supporting a bed, a driver for driving the belt along the bed, and a slave drive for transmitting rotational motion from the drive unit to the driver for driving the belt.

In one embodiment, the slave drive comprises a first sprocket connected to a drive shaft projecting from the drive unit, a second sprocket connected to the driver, and an endless chain connecting the first and second sprockets. In another embodiment, the slave drive comprises a first gear connected to a drive shaft projecting from the drive unit, a second gear connected to the driver, and a third gear between the first and second gears. Preferably, the third gear is supported by an arm that allows the third gear to rotate about the second gear while intermeshed therewith. As a result, the bed, belt, and driver are resting on the frame by gravity and may be bodily lifted upon rotating the third gear about the second gear a predetermined extent.

The conveyor may further include a pair of idlers for supporting the conveyor belt. In such case, a tensioner is provided for urging one idler into engagement with the chain. Preferably, the belt is comprised of a plurality of interlocking links.

In accordance with a second aspect of the invention, a conveyor for intended use in positioning in a gap between the ends of first and second adjacent conveyors is disclosed. The conveyor comprises a bed assembly including an endless belt or chain, a bed for supporting the endless chain, a driver for driving the chain relative to the bed, and first and second idlers for assisting in guiding the chain. At least one of the driver or idlers is movable for tensioning the belt or chain. A base adapted for attachment to an end of one of the first and second adjacent conveyors supports the bed assembly. Accordingly, the bed assembly may be bodily lifted from the base without the requirement of removing or slackening the associated belt or chain.

In one embodiment, the driver includes a shaft carrying a first gear for receiving rotational motion from a second driven gear associated with one of the first or second conveyors. The conveyor may further include a third gear for transmitting rotational motion from the second gear to the first gear. Preferably, the third gear is supported by an arm that allows the third gear to rotate about the second gear while intermeshed therewith. As a result, the bed assembly may be bodily lifted upon rotating the third gear about the second gear a predetermined extent.

In accordance with a third aspect of the invention, a conveyor system for articles includes a first conveyor, a second conveyor, and a frame positioned therebetween. The improvement comprises a transfer conveyor for feeding articles along the system spanning between the conveyor portions and including a conveyor belt driven in an endless path and defining a conveying surface for moving the articles from the feeding portion to the receiving portion. The transfer conveyor freely rests by gravity on the frame and is substantially fully releasable therefrom. Accordingly, the transfer assembly may be bodily lifted and released apart from the frame without the need for slacking the conveyor belt.

In one embodiment, the frame comprises a base including a pair of U-shaped cutouts for receiving the ends of a driven shaft of the transfer conveyor. The frame may further comprise a pair of notches for receiving detents associated with the transfer conveyor. The transfer conveyor may further comprise a pair of spaced side frame members, a drive structure supported by the side frame members, a bed supported by the side frame members, a pair of idler structures supported by the side frame members, and a tensioner including a pair of spaced arms mounted for pivoting movement relative to the frame members. Each arm includes a finger at one end for engaging one of the idler structures and a weight at the opposite end for causing the arms to pivot such that the fingers urge that idler structure into engagement with the chain.

The transfer conveyor of this aspect of the invention may further include or comprise a slave drive for transmitting rotational motion from a drive unit associated with the first or second conveyor to a drive structure for driving the belt or chain associated with the transfer assembly. The slave drive eliminates the need for a separate drive unit associated with the transfer conveyor. The slave drive may comprise a first gear connected to a drive shaft projecting from the first or second conveyor, a second gear connected to a driver for driving the belt or chain, and a third gear between the first and second gears.

In one embodiment, the third gear is supported by an arm that allows the third gear to rotate about the second gear while intermeshed therewith. Accordingly, the transfer conveyor may be bodily lifted upon rotating the third gear about the second gear a predetermined extent.

BRIEF DESCRIPTION OF THE DRAWINGS

The accompanying drawings incorporated in and forming a part of the specification illustrate several aspects of the present invention and, together with the description, serve to explain the principles of the invention.

In the drawings:

FIG. 1 is a side schematic view of a conveyor forming one aspect of the present invention positioned adjacent to the discharge end of a conveyor;

FIGS. 1a-1c are top and side views of an exemplary form of a chain for use with the disclosed conveyors;

FIG. 5 is a perspective view of the conveyor of FIGS. 3 and 4 with the bed section removed;

FIG. 6 is a perspective view of the conveyor of FIGS. 3 and 4 with the drive sprocket removed;

FIG. 7 is a perspective view of the conveyor of FIGS. 3 and 4;

FIG. 9 is a perspective view of one side of the conveyor of FIG. 8 in a partially disassembled state;

FIG. 10 is a side view of the conveyor of FIG. 8;

FIG. 11 is a partially exploded perspective view of the conveyor of FIG. 8;

FIG. 12 is an enlarged side view of the conveyor of FIG. 9;

DETAILED DESCRIPTION OF THE INVENTION

Figure 3:
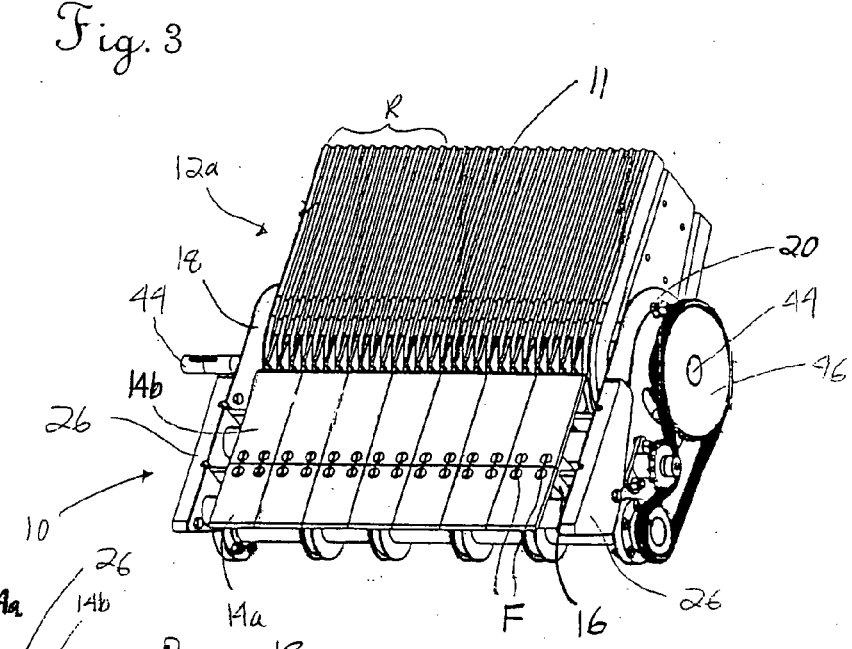
FIG. 3 is a different perspective view of the conveyor of FIG. 2 in a partially disassembled state.

With reference to the side schematic view of FIG. 1, a conveyor 10 constructed in accordance with one embodiment of the present invention is disclosed. The conveyor 10 may be positioned adjacent to a discharge end of a first conveyor 12a and the infeed end of a second, adjacent conveyor 12b (see FIG. 27) and functions to assist articles being conveyed in making the transition between the two conveyors (called a "transfer conveyor" in the vernacular). The first conveyor 12a is of the endless variety and, thus, includes an continuous belt B (fabric, rubber, link, etc.), modular link chain, or like structure that transitions from a forward to a return run adjacent to one end of the transfer conveyor 10.

The conveyor 10 also includes a conveying medium, such as a belt or chain C, which may be of the type disclosed in Applicant's co-pending application Ser. No. PCT US03/05666. An example of one type of chain C formed of links is shown in FIGS. 1a-1c (note interlocking links $L_1$, $L_2$ connected in snap-fit engagement and including laterally repeating sections $L_3$ defining gaps G). This chain C is "rodless," which means that there are no separate transverse connector rods for interconnecting the links. In cases where such a chain C is used with the upstream conveyor 12a, the corresponding bed 11 associated with a support structure or frame may include a plurality of spaced rails R for engaging the gaps G (see FIG. 3). A bridge structure S (sometimes called a finger plate, finger bar, comb, etc.) may also be provided for assisting articles being conveyed in making the transition from the adjacent conveyor 12a to the conveyor 10 (and may be part of the conveyor, as described further below).

Further describing the "rodless" chain C, and with continued reference to FIGS. 1a-1c, each adjacent link $L_1$, $L_2$, includes a first integral connector 11. In the illustrated embodiment, the first integral connector 11 is a single, continuous, generally cylindrical piece of material that is integrally formed. Each link $L_1$ or $L_2$ includes receivers 13 for receiving the integral connector 11 of an adjacent link. The receivers 13 each include an oversized entryway and a pair of opposed sidewalls. The sidewalls preferably slope inwardly towards each other when viewed from the side and, thus, form a neck N through which a structure, such as the first integral connector 11 of an adjacent link, may pass to create the snap-fit engagement.

Turning now to FIGS. 1b and 1c specifically, the manner in which two or more of the links $L_1$, $L_2$, are interconnected to form the chain C is illustrated in detail. FIG. 1a shows that two links $L_1$, $L_2$ may be interconnected by positioning the first integral connectors 11 in the entryway of the receiver 13. Gentle pressure is then applied to either or both of the links $L_1$, $L_2$ such that each first connector 11 passes along the tapered sidewalls and past the neck N to form a snap-fit engagement in the receiver 13.

Each first connector 11 can pass through the neck N, yet remains securely captured once in place in the receiver 13. As can be appreciated from viewing FIG. 1c, each receiver 13 is slightly oversized relative to the corresponding first connector 11. Accordingly, when the two links $L_1$, $L_2$ are interconnected in snap-fit engagement, one is capable of pivoting relative to the other. Hence, once the desired snap-fit engagement is established between the receivers 13 and the corresponding first connectors 11, the next-adjacent link $L_1$ or $L_2$ is simply rotated into position. Now describing the basic structures comprising the conveyor 10 of this embodiment, and with continued reference to FIG. 1, a bed 14 supports the chain C by engaging the underside surface along an article conveying or transfer "zone" Z. As perhaps best shown in FIGS. 2, 3, and 4, the bed 14 is preferably comprised of a thin, plate-like structure fabricated of a wear-resistant material (food grade ultra-high molecular weight (UHMW) polypropylene), aluminum (preferably extruded), or a non wear-resistant material with a wear-resistant coating). The bed 14 may be a unitary structure or, as shown, may optionally comprise a plurality of opposed pairs of relatively thin (e.g., ¼") plates 14a, 14b.

Each plate 14a, 14b includes at least one rounded edge or end defining a "nose" or "nose bar" for engaging the chain C as it transitions between the forward and the return run along the conveyor 10 (such as in the direction of action arrow A, which corresponds to the conveying direction when the conveyor 12a is considered in an upstream position). Preferably, the "nose bar" created by each plate 14a, 14b is sized so as to correspond to the minimum turning radius of the chain C (e.g., about 6 millimeters for the chain disclosed in FIGS. 2a-2c and having a corresponding turning radius). The plates 14a, 14b may have different major dimensions (lengths) such that those along the entry end of the conveyor 10 overlap with a recessed portion of the bridge structure S and, therefore, eliminate any gap that may otherwise be present.

Figure 4:
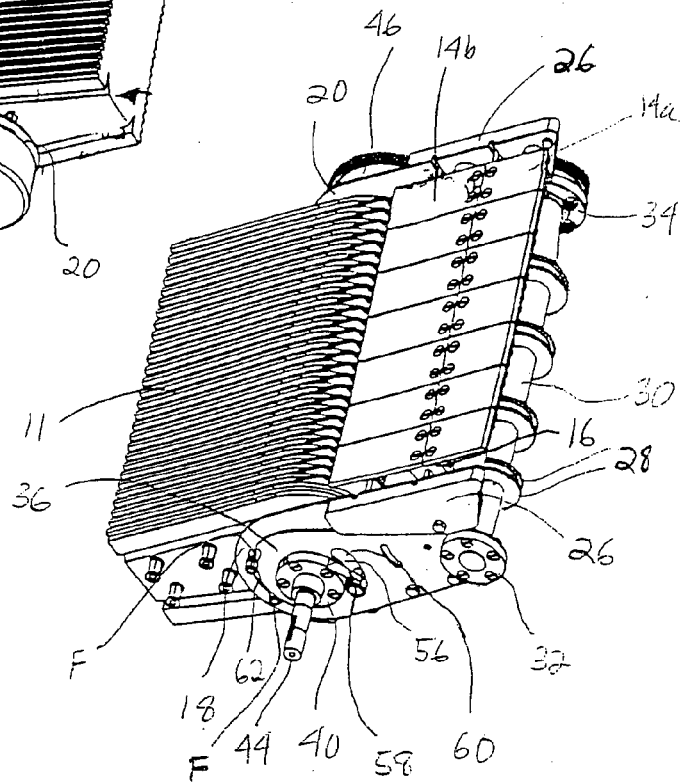
FIG. 4 is another perspective view of the conveyor of FIG. 3.
Figure 8:
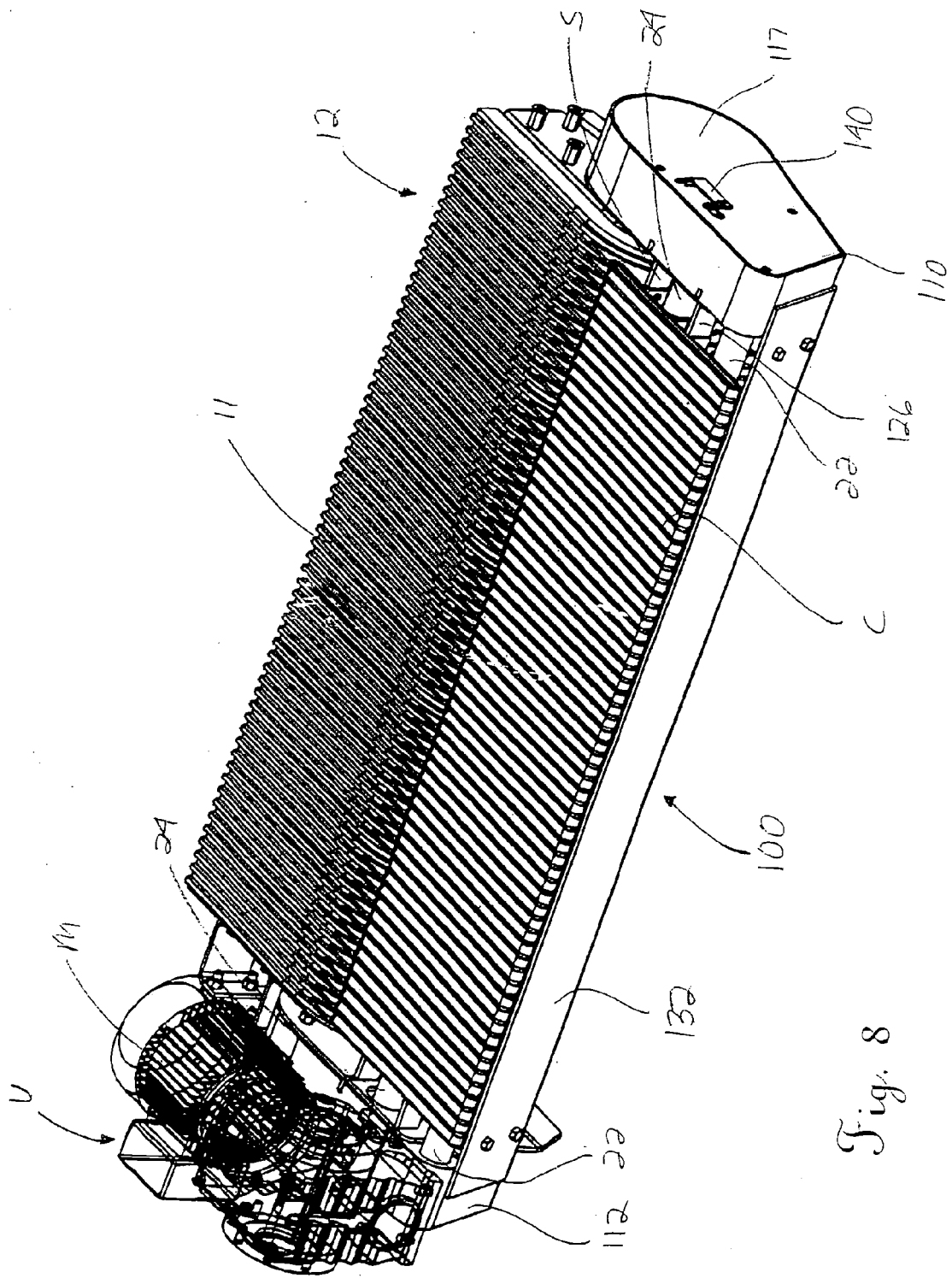
FIG. 8 is a perspective view of a second embodiment of a conveyor for possible use in a transfer arrangement.

As perhaps best understood with reference to FIGS. 1, 3 and 4, the plates 14a, 14b are secured by fasteners F to a cross member 16 extending between a frame including a pair of side frame members 18, 20. The cross member 16 may be a unitary structure, or optionally may be in the form of a plurality of support structures 16a . . . 16n (see FIG. 7), each for supporting an opposed pair of the wear-resistant plates 14a, 14b. The support structures 16a . . . 16b may rest on and be supported by a transversely extending cross bar 17, the ends of which rest in notches (not numbered) formed in the side frame members 18, 20. The notches are preferably vertically oriented, which allows for the entire bed 14 to be easily bodily lifted and removed once the chain C is slackened or removed altogether. This of course facilitates removing a jam as well as servicing of the conveyor 10. In operation, the tension supplied to the chain C (see below) helps to create a hold down force that keeps the bed 14 securely held in the operative position, while the engagement between the cross bar 17 and the notches resists any movement in the direction of travel of the chain C.

Providing a wear structure comprised of a plurality of unitized, modular assemblies, such as the support structures 16a . . . 16n and the plates 14a, 14b, make this arrangement adaptable for use in any width of transfer conveyor 10 (which normally depends on the width of the adjacent conveyors, such as conveyor 12). However, as mentioned above, the use of a single support structure 16 for supporting a single wear plate (not shown) is entirely possible. The side frame members 18, 20 may also support the bridge structure S (such as by including notches for receiving an outwardly projecting portion of this structure similar to the cross bar 17), and may be connected by a transversely extending structural member, such as a tie rod 19 (see FIG. 7). This allows the bridge structure S to be easily lifted from the operative position for cleaning or in the event of a jam.

The conveyor 10 also includes idler structures for engaging the chain C as it moves along the return run. These structures may be fixed or stationary shafts or rolls 22, 24 supported by the side frame members 18, 20 and spaced from each other in the conveying direction (that is, in the direction defined by action arrow A in FIG. 1). When the rolls 22, 24 are adapted for rotation, bearings (not shown) may be supported by each side frame member 18, 20 and may be covered by a suitable cover or housing 26 (see FIGS. 4 and 7) to prevent external interference. In either case, the rolls 22, 24 may be provided with a wear-resistant coating or wear-resistant structures (which may also be high-friction structures to prevent slipping, which is preferable in cases where the idler rolls are rotatable).

In one possible embodiment, as shown in FIG. 7, the wear resistant structures may be in the form of O-rings O for engaging the outside surface of the chain C as it moves through the conveyor 10. The O-rings O may be seated in annular grooves or depressions formed in the roll 22, 24. In the case where the chain C is a version with gaps between laterally repeating sections (note reference character G in FIG. 2), the O-rings O are strategically positioned to "ride" in this gap and engage the chain C as it moves along. This not only reduces the wear on the conveying surface (which is the portion of the links between the gaps), but also helps to guide or center the chain C.

The chain C is driven through the conveyor 10 by a drive structure. In the illustrated embodiment, and as perhaps best understood with reference to FIGS. 1, 4, 5, and 7, the drive structure comprises a plurality of spaced drive sprockets 28 supported and gang driven by a support shaft 30. The sprockets 28 are spaced in a direction transverse to the conveying direction so as to align with corresponding engagement structures on the chain C (such as the connectors in the gaps G between the laterally repeating sections $L_3$), and may each be split in order to facilitate installation and removal without removing the support shaft 30 from the mounted position. Of course, the spacing and number of the sprockets 28 may vary, depending on the particular type of chain C used. Instead of sprockets 28, a drive roller may be substituted for frictionally engaging and driving a belt (which could be fabric or rubber) or even the chain C, although depending on the materials used, this may be deleterious from both an efficiency and wear standpoint.

One possible advantage of the conveyor 10 forming part of the present invention is that it may be easily adapted for slaving to a drive unit U (including a motor) associated with an adjacent conveyor, such as the adjacent (infeed) conveyor 12. Since the drive unit U includes a motor for driving the conveyor 12a (see FIG. 7), this advantageously avoids the need for providing a separate electric motor or other motive device for the conveyor 10. This not only allows for the conveyor 10 when used in a transfer arrangement to be more compact, but also reduces the complexity and cost. The modular nature of the components of the transfer conveyor 10 also makes it readily adaptable for use with most existing types of infeed and discharge conveyors without significant effort or the need for extensive retrofitting.

Figure 2:
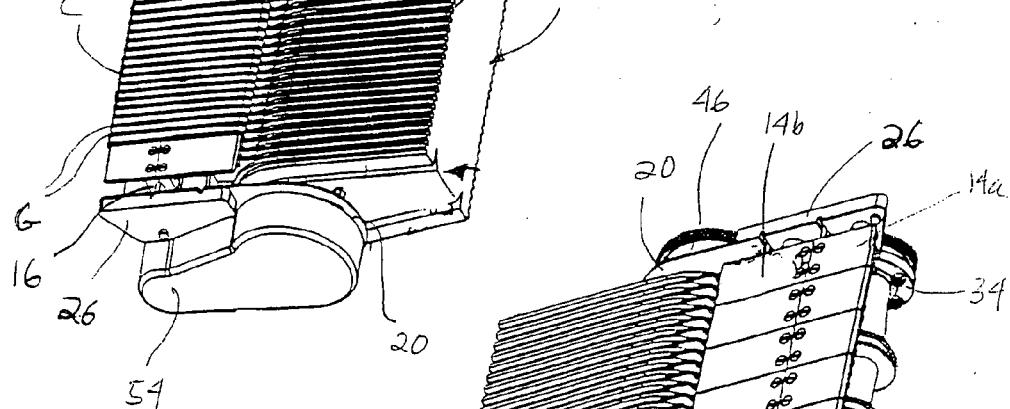
FIG. 2 is a perspective view of one embodiment of a fully assembled conveyor for possible use in a transfer arrangement.

To create the desired slave drive arrangement in one embodiment, the ends of the support shaft 30 may be journaled in bushings 32, 34, as shown in FIG. 7. Each bushing 32, 34 is supported by a frame including a pair of side frame members 36, 38. The side frame members 36, 38 are connected by structural members, such as tie rods 39, and also carry bushings 40, 42 at the opposite end for receiving a portion or extension of the drive shaft 44 forming part of the drive unit U that drives the belt B, chain, or like conveying medium on the adjacent conveyor 12. An extension of the drive shaft 44 adjacent to one lateral side of the transfer conveyor 10 is coupled to a drive sprocket 46, which engages a drive belt or chain 48 that in turn causes a driven sprocket 50 coupled to the corresponding end of the sprocket support shaft 30 to rotate. A tensioner for tensioning the drive chain 48, such as an idler sprocket 52, is also supported by and journaled in the corresponding side frame member 38 (and the corresponding support shaft (not shown) may extend over to and be journaled in side frame member 26 as well). As shown in FIG. 2, this entire drive subassembly may be provided with a cover 54 to protect the moving parts by guarding against external interference.

To avoid disrupting the flow of conveyed articles, the sprockets 46, 48 are preferably selected to ensure that the chain C of the conveyor 10 is driven at substantially the same speed as the belt B or chain on the adjacent conveyor 12. However, it is also possible to size the sprockets 46, 48 such that the chain C of the conveyor 10 when used as a transfer moves slightly faster than the belt B on the adjacent conveyor 12a to accelerate the articles slightly and widen any gap or spacing present. Of course, a conveyor 10 with a slower running chain C could also be used in an effort to accumulate articles being conveyed or close any gap or space present. In both cases, the direction of travel generally remains the same.

As should be appreciated, because the bushings 40, 42 attached to the side frame members 36, 38 journal the drive shaft 44, the entire drive subassembly including the side frame members 36, 38 and the support shaft 30 may freely pivot about the axis thereof, and is generally urged toward the corresponding surface of the chain C as the result of gravity. To counteract the effects of gravity on this subassembly and, thus, the associated tensioning force applied to the chain C, a counterbalancing means or mechanism is provided. In one possible embodiment, this means or mechanism comprises a constant force spring 56 supported by the frame member 20 for engaging a stub shaft 58 that projects through a slot 60 formed in the adjacent side frame member 36 defining the range of pivoting movement. The spring 56 may be fastened to the bushing 40 for the drive shaft 44. A similar mechanism may also be provided on the opposite side of the conveyor 10 (note stub shaft 58 projecting from the fixed frame member 20 in FIG. 6).

Each mechanism (spring) when oriented as shown effectively urges the drive shaft 30 away from the chain C (i.e., in a direction generally opposite to the direction of gravity). However, gravity urges the support shaft 30 toward an inside surface of the chain C (e.g., generally downwardly, but slightly toward the conveyor 12a because of the arcuate shape of the slot 60 in which the stub shafts 58 travel; see action arrow D in FIG. 1). By balancing the competing forces, the sprockets 28 are kept in engagement with the corresponding surface chain C in a consistent and even manner to provide just the right amount of tension. This advantageously ensures that the chain C is driven through the conveyor 10 in an even, smooth manner without binding or slipping. Nevertheless, in the case where the chain C needs to be adjusted or removed, the tensioning force created is easily overcome or removed by simply lifting up on the shaft 30. A related advantage of the resulting balanced force is the concomitant automatic or self-tensioning of the drive chain 48 when the optional slave drive is used.

With specific reference to FIG. 6, an optional feature is to adjustably mount the conveyor 10 for selective positioning at an incline or decline relative to the adjacent conveyor 12. Specifically, an arcuate slot 62 may be provided in each side frame member 18, 20 for receiving fasteners F mounted to the side frame or bed 11 of the adjacent conveyor 12. By tightening or securing the fasteners F against the corresponding surface of the frame member 18, 20, the angle or tilt of the conveyor 10 relative to the adjacent conveyor 12a may be fixed. Thus, the conveyor 10 may be oriented generally parallel to a horizontal plane, as shown in the drawing figures, or may be tilted in either direction a certain range, as defined by the length of the arcuate slot 62 (e.g., ±15°). As should be appreciated by those of skill in this art, this feature is advantageous when one of the adjacent conveyors is positioned in a different horizontal plane (i.e., either above or below) the other. The driven nature of the chain C also allows the transfer conveyor to be positioned at a greater angle of inclination without resulting in product stalling than is possible when using a passive, roller type transfer conveyor. Incorporating one of the several embodiments of high-friction and cleat chains disclosed in patent application Ser. No. PCT US03/05666 may also help in situations when the conveyor 10 is used for conveying articles from one location to another along an incline.

A second embodiment of the driven conveyor 100 forming part of the present invention is shown in FIGS. 8-16. This embodiment is similar in that the conveyor 100 may be positioned in juxtaposition to one end of a conveyor 12a (note bed 11), and includes an endless belt or chain C that may be slave driven by the drive unit U associated with the conveyor (see motor M in FIG. 8 supported from the adjacent conveyor 12a by a bracket K (see FIG. 16)). However, the conveyor 100 of this embodiment does not include any "floating" subassembly for supporting the drive structure.

Accordingly, instead of using a sprocket 52 for tensioning the drive chain 48 (as is done in the first embodiment as a result of the pivoting movement of the frame members 36, 38 about the transverse axis defined by the drive shaft 44), a pivotally mounted arm 102 supports or carries a camming structure 104. This camming structure 104 may be semi-circular and thus includes a curved or contoured face adapted for engaging an outer surface of the drive chain 48. The force for moving the arm 102 and hence camming structure 104 into engagement with the chain 48 is supplied by a torsion spring 103. As perhaps best shown in FIG. 12, the spring 103 may be mounted over a post P formed in a recess 111 in a housing 110 for the drive subassembly such that one leg 103a engages an adjacent (upper) wall of the housing and the other leg engages the adjacent (upper) surface of the arm 102 and, consequently, moves the camming structure 104 into engagement with the drive chain 48 (see FIGS. 9, 10, and 12). A pivotally mounted chain guard 105 may also be supported by the housing 110 (see FIG. 12).

A second difference is that, instead of tensioning the chain C using a pivotally mounted drive structure, the conveyor 100 of this embodiment includes a movable or "floating" idler structure. Specifically, the ends of one of the idler structures, such as roll 24, extend through slots 106, 107 formed in side frame members 108, 109 supported by the end of the adjacent conveyor 12a (see FIGS. 13, 14, 15, and 16). One side frame member 108 in turn supports the housing 110, and the other side frame member 109 supports a second, similarly constructed housing 112 on the opposite side of the conveyor 100. Each housing 110, 112 also includes a slot or elongated opening 114, 116 for receiving the ends of one of the idler structures, such as roll 24. A bearing 113 may be provided for sliding to and fro with the idler structure or roll 24 in a recess 115 surrounding each elongated opening (see opening 114 in FIG. 13). As a result of this arrangement, the idler structure or roll 24 is capable of "floating," or moving to and fro in and relative to these slots or openings 106, 107 and 114, 116. Protective covers 117 are also provided for the housings 110, 112.

To provide tensioning if desired, a mechanism or means is provided for urging the "floating" idler structure into engagement with an outer surface of the chain C along the return run (such as at the transition between a non-horizontal or vertical portion to a horizontal portion, in the situation where the return path is T-shaped as shown in the drawing figures)). In the preferred embodiment where the chain C is driven in a counterclockwise direction when viewed from the right hand side when facing the end of the conveyor 12a (see, e.g., action arrow A in FIG. 10 representing the conveying direction), the tensioning mechanism or means comprises a pair of constant force springs 118. The springs 118 are fixedly mounted to each housing 110, 112 at one end and have a free end for urging the idler roll 24 into engagement with the outer surface of the chain C (that is, to the left in FIG. 10).

Each spring 118 or other mechanism used is selected so as to provide a substantially constant amount of force for causing the idler roll 24 or other idler structure to engage and automatically tension the chain C over the drive structure, such as the plurality of gang-driven sprockets 28 mounted on a common drive shaft 30. Instead of a constant force spring, an alternative is to use a different type of spring for pushing the idler structure toward the chain C (see Sanki Engineering's U.S. Pat. No. 5,871,085, the disclosure of which is incorporated herein by reference), although this increases the space requirements and may thus be less desirable. In either case, the housing 110 may be provided with a stable support structure, such as a mounting projection 119 (see FIG. 12), for engaging the opposite (free) end of the spring 118 or otherwise supporting the urging mechanism.

The entire conveyor 100 of this embodiment may also be adjustably mounted for pivoting about the axis defined by the drive shaft 44 (see double headed action arrow Y in FIG. 10). To accomplish this, both frame members 108, 109 and the corresponding housings 110, 112 are provided with slots 108a, 110a; 109a, 112a for receiving suitable fasteners F that extend into and are supported by the frame or bed 11 of the adjacent conveyor 12. As explained above, by securing the fasteners F against a corresponding surface of the frame member 108, 109, the angle or tilt of the conveyor 100 may be fixed relative to the adjacent conveyor 12.

Referring to FIG. 11, the bed 14 in this embodiment is shown as being formed of two identical pieces of an elongated or plate-like wear-resistant structure 124 (preferably coated with UHMW polypropylene) secured to a support structure 126. The support structure 126 may include a projecting portion for resting in a notch 128 formed in each side frame member 108, 109, as well as a recess 130 formed in a portion of each housing 110, 112 and a pair of support brackets 127 fastened to the support structure 126 for supporting the wear-resistant structure 124. This mounting arrangement secures the bed 14 against movement to and fro or from side-to-side, but allows it to be easily lifted in the vertical direction when the chain C is slackened or removed. An optional, generally L-shaped guard 132 may also be secured to the frame members 108, 109 (such as on flanges 108b, 109b), or instead may be secured to housings 110, 112.

Figure 16:
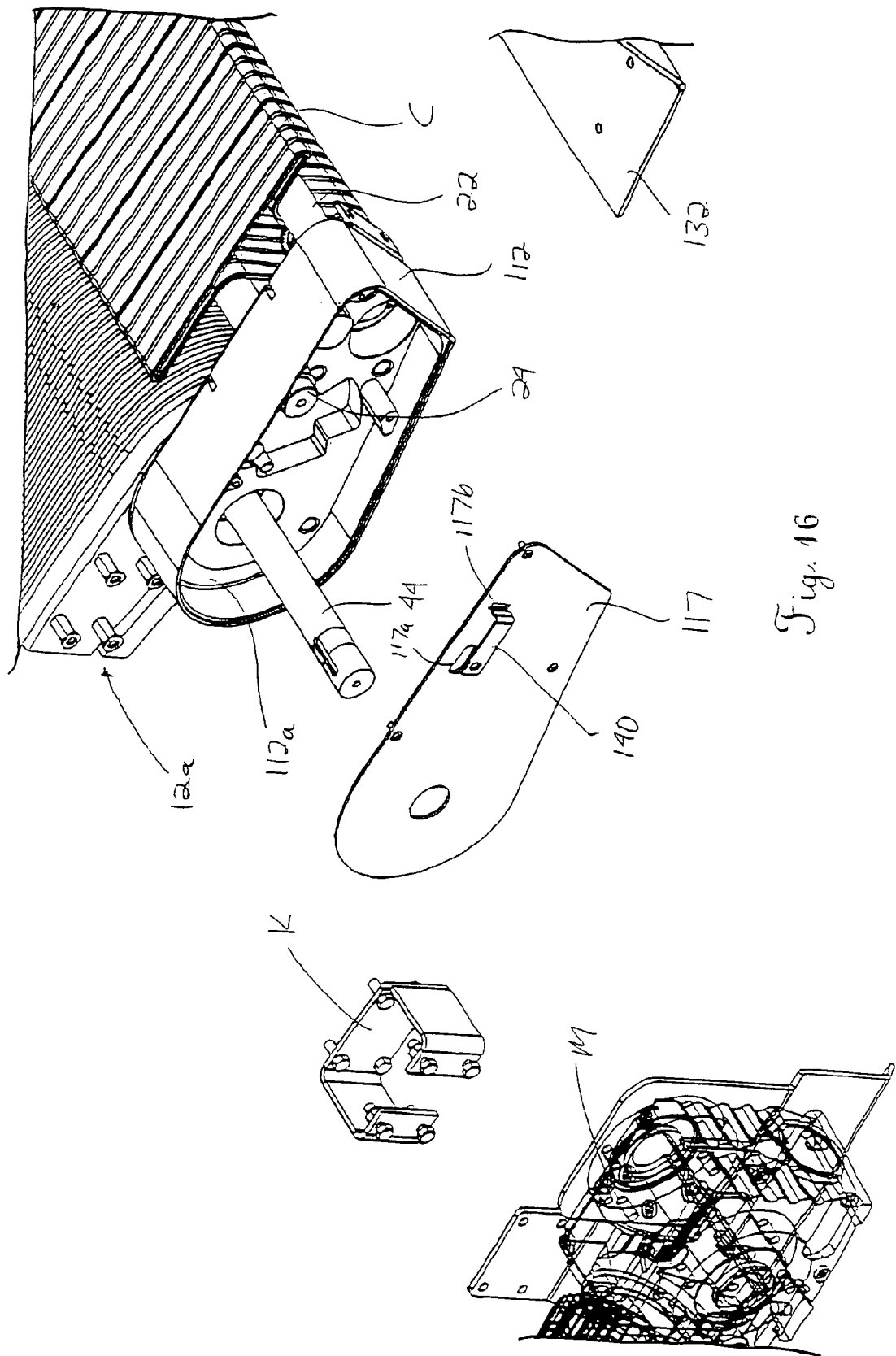
FIG. 16 is a partially exploded view of the side of the conveyor shown in FIG. 15.

A portion of the "floating" idler structure, such as roll 24, may also extend through both covers 117. FIG. 16 shows an opening 117a formed in the drive-side cover 117 for receiving this end of the roll 24. The projecting end of this roll 24 on both sides of the conveyor 100 may be secured to a clip 140. During normal operation, these clips 140 simply remain in position adjacent to the outer surface of the cover 117 and freely move along with the corresponding shaft (not shown) or other extension of the roll 24 to which it is attached. When it is necessary to release the tension on the idler structure, such as roll 24, the clips 140 are manually grasped and moved such that an inwardly protruding end of each is received and captured in an opening 117b formed in the cover 117. This feature advantageously allows for adjustments to be made to the chain C when slackened, or allows for the chain to be removed altogether, without requiring full or even partial access to the constant force spring 118 or other mechanism for urging one idler structure into engagement with the outer surface of the chain C (that is, without the need for removing the covers 117 or any other components).

Figure 13:
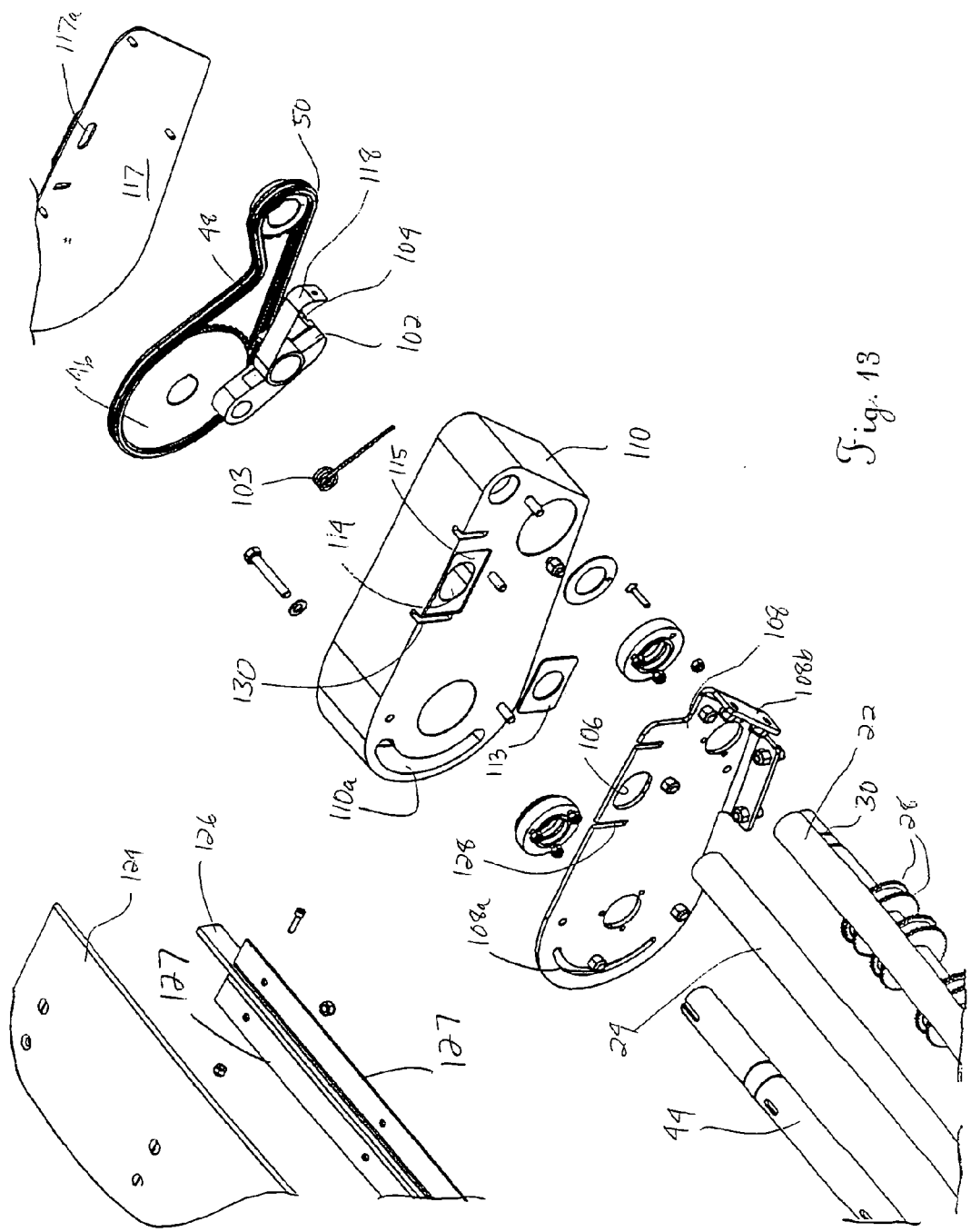
FIG. 13 is an exploded perspective view of one side of the conveyor of FIG. 8.
Figure 14:
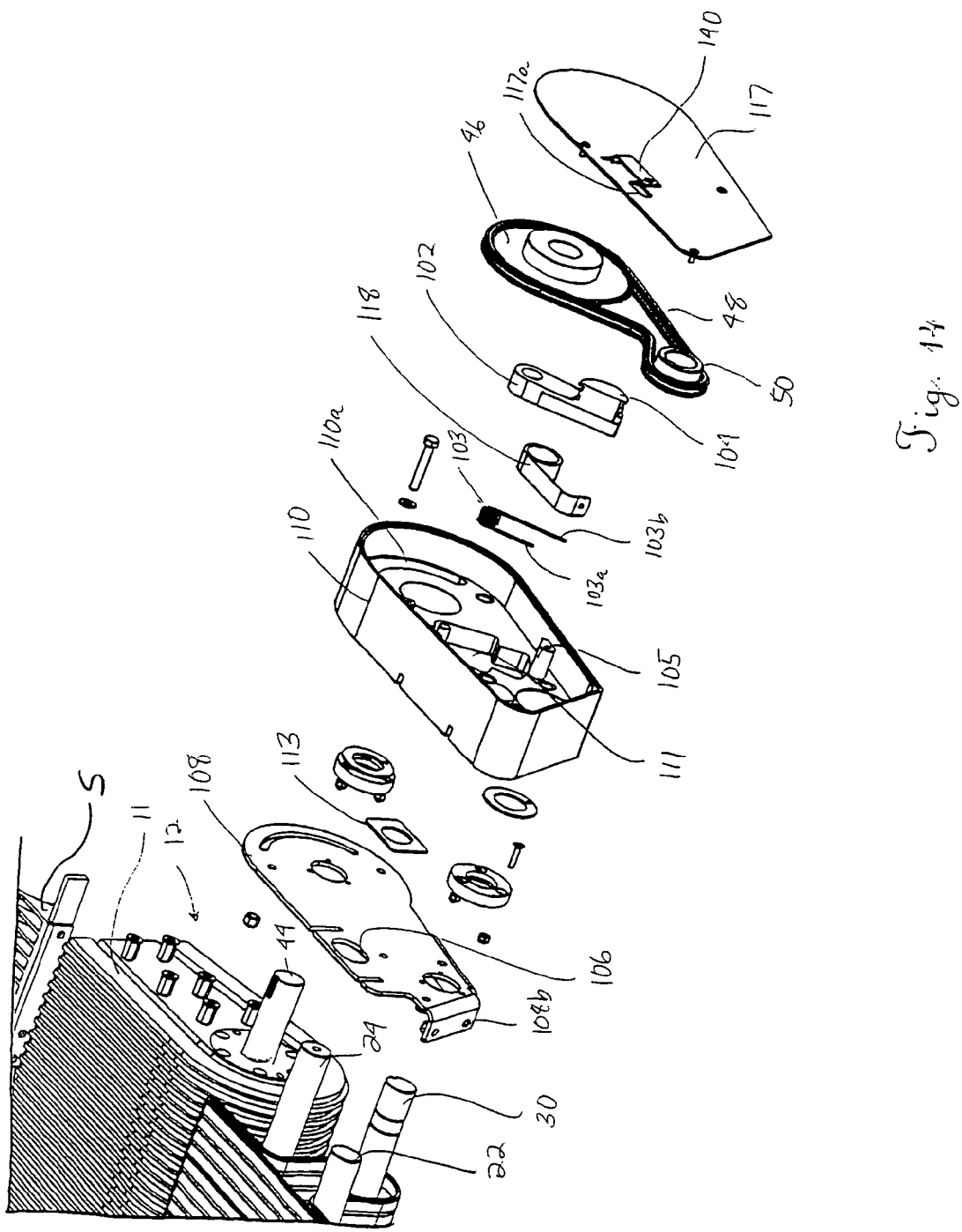
FIG. 14 is a perspective view similar to FIG. 13 taken from a different vantage point.
Figure 15:
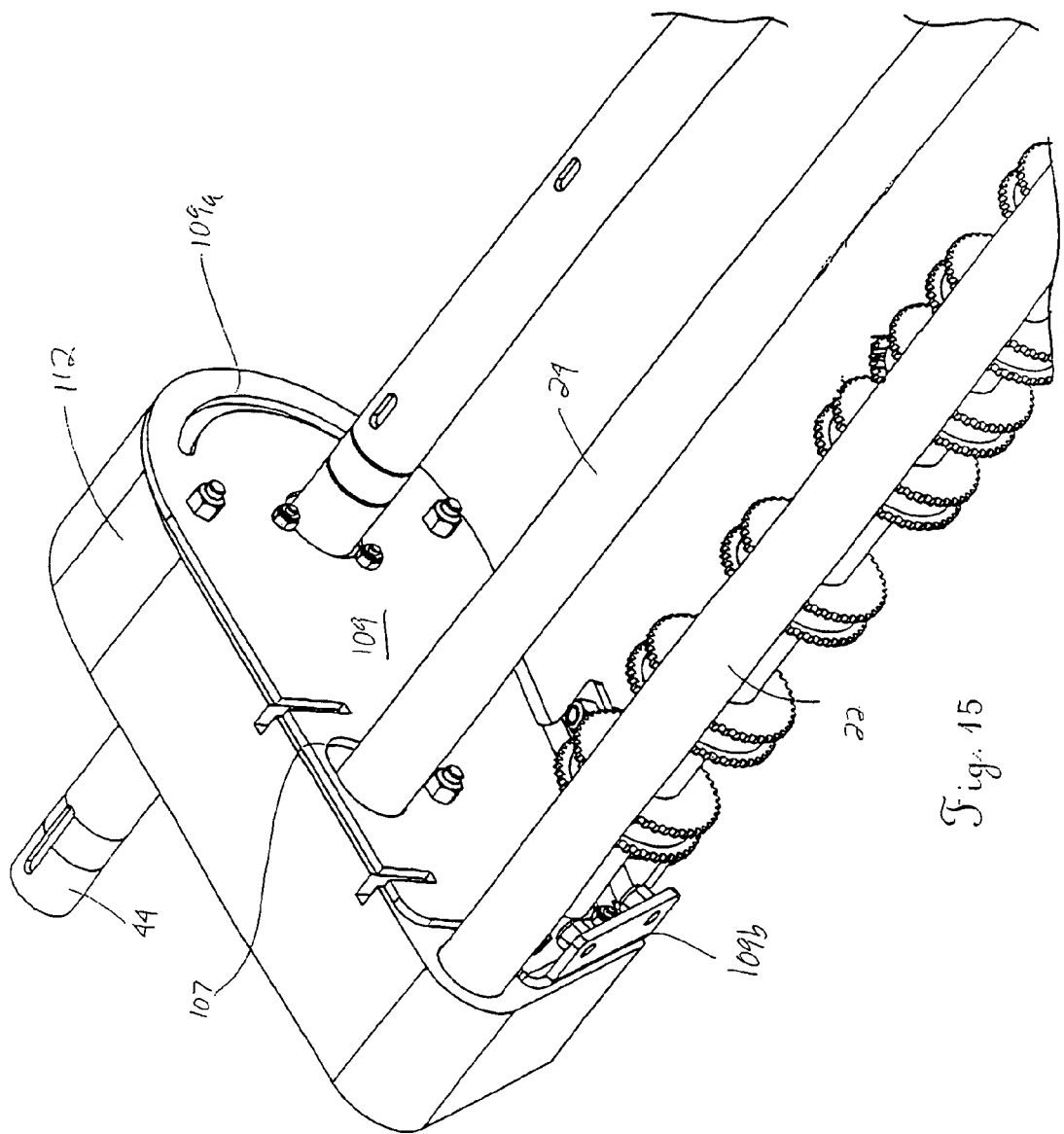
FIG. 15 is a perspective view of the other side of the conveyor of FIG. 8.

As should be appreciated from FIGS. 13 and 16, the plates 108, 109 and housings 110, 112 also include suitable openings for receiving the drive shaft 44 and the support shaft 30. Only the housings 110, 112 are shown as including an opening for receiving the other idler structure or roll 22. As with the first embodiments, suitable bushings or bearings may be provided for rotatably supporting any or all of these structures.

Figure 17:
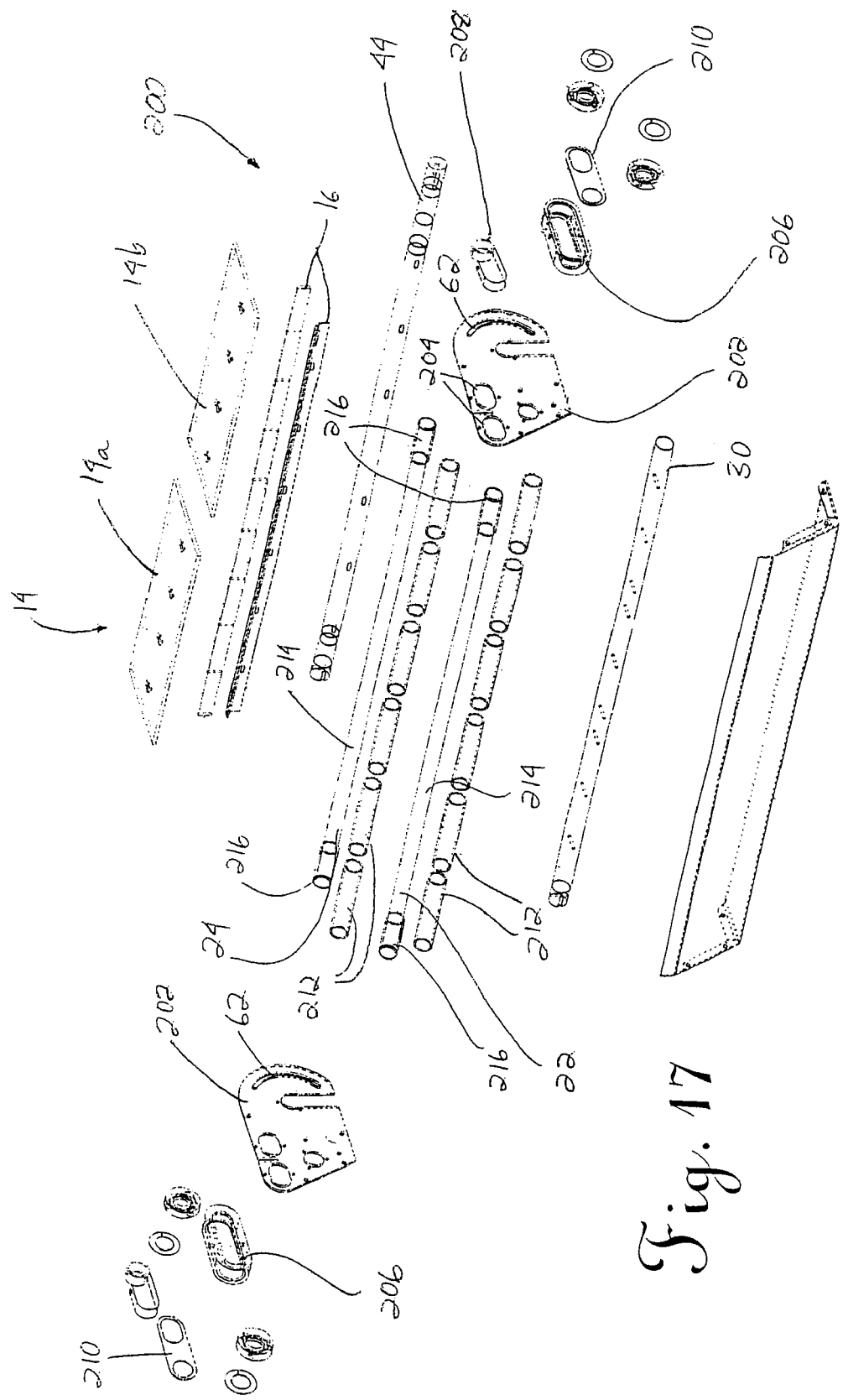
FIG. 17 is an exploded view of a third embodiment of a conveyor for possible use in a transfer arrangement.

A third embodiment of the conveyor 200 shown in FIG. 17. This embodiment is also adapted for being supported by an adjacent conveyor 12a and slave driven by the corresponding drive unit (not shown). One modification in this embodiment is an adjustment to the manner in which the "floating" idler structure, such as for example roll 24, is tensioned. Specifically, in the embodiment shown in FIG. 17, the chain C is driven in the direction of action arrow A, preferably by slaving the drive shaft 30 to the drive unit of the adjacent conveyor substantially as described above, and the idler structure (roll 24) closest to the adjacent conveyor is mounted for floating movement in a generally horizontal plane, toward the opposite idler structure (roll 22). A pair of side frame members 202 include elongated slots 204 through which the ends of both idler structures or rolls 22, 24 pass. The ends of these structures or rolls 22, 24 extend through an elongated or oblong tensioner bushing 206 connected to and supported by each side frame member 202. Each frame member 202 also includes a suitable opening for receiving the ends of driven shaft 30, a slot for positioning over the drive shaft 44 of the adjacent conveyor, and machined holes as necessary for receiving fasteners (including those for holding any bushings or covers in place).

A tensioner or tensioning means is provided, which includes a means for urging one idler structure or roll 22, 24 into engagement with the corresponding outer surface of the chain C along the return run (which is shown as having a T-shaped path including a first horizontal portion, a non-horizontal portion created by the training of the chain C over the first idler structure or roll 22, and a second horizontal portion created by the training of the chain over the second idler structure or roll 24). In the illustrated embodiment, the urging means forming part of the tensioner includes a constant force spring 208 for positioning along each side of the transfer conveyor 200. A first free end of each spring 208 is fixed to the corresponding bushing 206 by a fastener F. Each spring 208 is then wrapped around the fixed idler structure (roll 22 in this case) and the opposite, coiled end engages the corresponding end of the idler structure or roll 24.

An oblong retaining plate or cover 210 sized to cooperate with each tensioner bushing 206 is positioned over the ends of the idler structures or rolls 22, 24 and secured in place, such as by placing a retainer clip over the end of at least the non-floating idler structure or roll 22 (and possibly over the other as well). Each cover 210 includes a first opening for receiving and fixing the position of one idler structure, such as structure 22 in FIG. 17, and a second, oversized opening for allowing the other idler structure (roll 24 in this case) to move to and fro.

As a result of the tension force supplied to each end of the idler structure or roll 24 by the urging means, such as the constant force spring 208, it is thus urged toward the opposite idler structure or roll 22 and into contact with the outer surface of the chain C. This serves to tension the chain C in the conveyor 200 as it is driven in the direction of action arrow A along the generally T-shaped path by the drive sprockets 28. As should be appreciated, the tensioning mechanism is thus very simple and compact as compared to those in the prior art (see, e.g., the Dolan '296 patent), which helps in reducing the overall size and complexity of the conveyor 200.

To release the tension on the chain C, the operator simply moves the ends of the idler structure (roll 24) such that the force supplied by the spring 208 is overcome. Preferably, this may be accomplished by mere finger action or by using a simple tool for leverage. If it is desirable to hold the idler structure in this position for an extended period of time, the cover 210 may be reoriented and returned such that the end of the floating idler structure (roll 24) passes through and engages the smaller, or non-oversized, opening. This engagement thus holds the "floating" idler structure (roll 24) out of engagement with the chain C, which is therefore in a slackened state. In any case, servicing and inspection, including of the bed 14, are greatly facilitated as a result of the ease with which the tension on the chain C is released.

Through experimentation, it has been discovered that in some situations, including when the chain C is driven in a direction opposite that of action arrow A (that is clockwise when viewed from the right, as in FIG. 1), it is desirable to allow the other, or first idler structure 22 to float while fixing the second idler structure 24 closest to the adjacent conveyor 12. As should be appreciated, the tensioning arrangement disclosed for use in this third embodiment is easily reversible for achieving this result. Specifically, the covers 210 are simply removed and the urging means is adapted for urging the first idler structure, such as roll 22, into engagement with the corresponding outer surface of the chain C. This may be accomplished by simply reorienting the constant force spring 208 within each tensioner bushing 206. In either case, the cover 210 is then returned and secured in place, such that the ends of idler structure or roll 24 remain fixed in the corresponding openings, while the ends of idler structure or roll 22 remain free to move within the corresponding slots as a result of the urging force supplied by the springs 208.

An optional feature of the embodiment depicted in FIG. 17 is to include oversized tubes or bushings 212 as part of each idler structure, such as by positioning them directly on the rolls 22, 24. The outer surfaces of these bushings 212 thus engage the outer surface of the chain C and rotate about the corresponding support shaft 214 as it moves through the transfer conveyor 200. Preferably, these bushings 212 are made of a highly wear-resistant material, such as UHMW polypropylene. Optional bushings 216 may also be supported by the ends of the shafts 214 forming part of each idler structure. In the illustrated embodiment, the outer diameters of these bushings 216 correspond to the inner diameter of the corresponding portion of the constant force spring 208 and the opening in each cover 210. It is also noted that the bed 14 (which is shown as including two substantially identical plates 14a, 14b connected to the support structure 16 by fasteners) is also supported by a support structure 16 adapted to fit in slots or notches formed in the side frame members 202. This allows for the easy removal of the bed 14, such as for inspection or replacement, once the chain C is slackened or removed.

As noted above, each side frame member 202 may be mounted to the adjacent conveyor 12a by fasteners that extend through an arcuate slot 62 formed therein. As described above, this allows for the transfer conveyor 10 to be tilted relative to the adjacent conveyor 12, such as when the discharge conveyor (not shown) is in a different horizontal plane. The pivoting is about the ends of the drive shaft 44 of the adjacent conveyor, which as mentioned above are received in slots formed in the side frame members 202 (and may include appropriate bearings or bushings to facilitate free rotation therein).

A fourth embodiment of a conveyor 300 is shown in FIGS. 18-24. In this embodiment, the conveyor 300 is comprised of two sub-assemblies: (1) a bed subassembly 302; and (2) a mounting base subassembly 304 for receiving and supporting the bed subassembly 302. In the illustrated embodiment, the mounting base subassembly 304 includes a frame or base 305 supported from the end of an adjacent conveyor 12, such as by a fastener F. As described above, the fastener F may pass through an arcuate slot 306 formed in each side of the base 305. It should be appreciated that this arrangement allows for changing the angle of the base 304 (and hence the bed assembly 302 supported thereby) relative to the adjacent conveyor 12. In the case where the conveyor 300 is used in a slave arrangement, an opening 308 may also be provided through which a shaft 310 carrying a gear or sprocket 312 at one end may pass. The other end of the shaft 310 may be associated with a motive device, such as a variable speed electric motor, for driving the adjacent conveyor 12.

Figure 18:
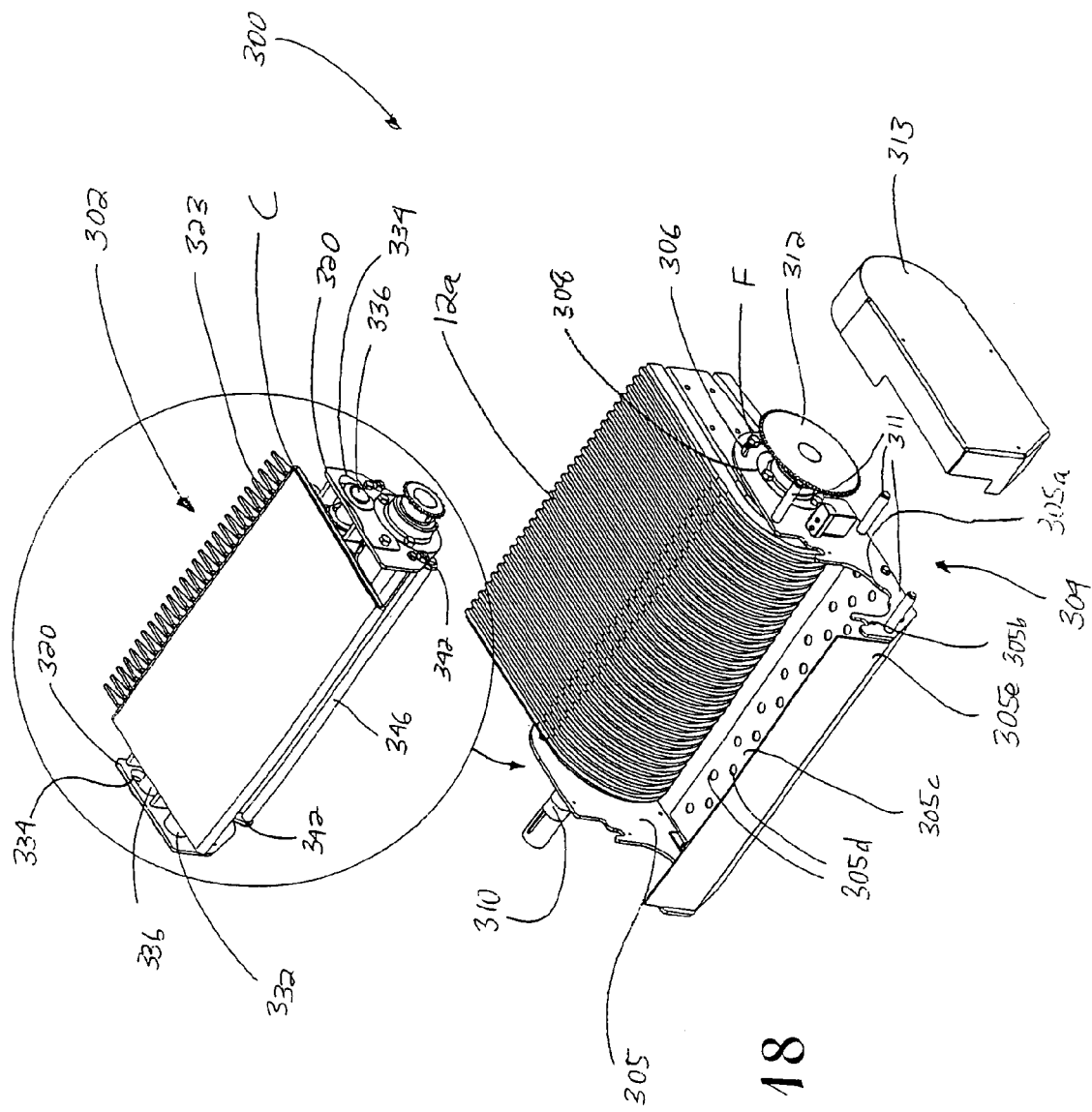
FIG. 18 is a perspective view of another embodiment of a conveyor for possible use in a transfer arrangement.

With continued reference to FIG. 18, the base 305 also includes sidewalls including generally U-shaped cutouts 305a for receiving a portion of the bed subassembly 302 or a structure associated with it. One or more notches 305b are also provided adjacent to the cutouts 305a for performing a similar function, as outlined further in the description that follows. The floor 305c of the base 305 may also be provided with apertures 305d for allowing cleaning fluids to pass. A generally vertical front wall 305e also serves as a guard for the bed subassembly 302. Structures such as shafts 311 projecting from the base 305 may also support a removable cover 313 to guard the drive sprocket 312, any transmission chain (not shown), and any other movable structures present.

Figure 19:
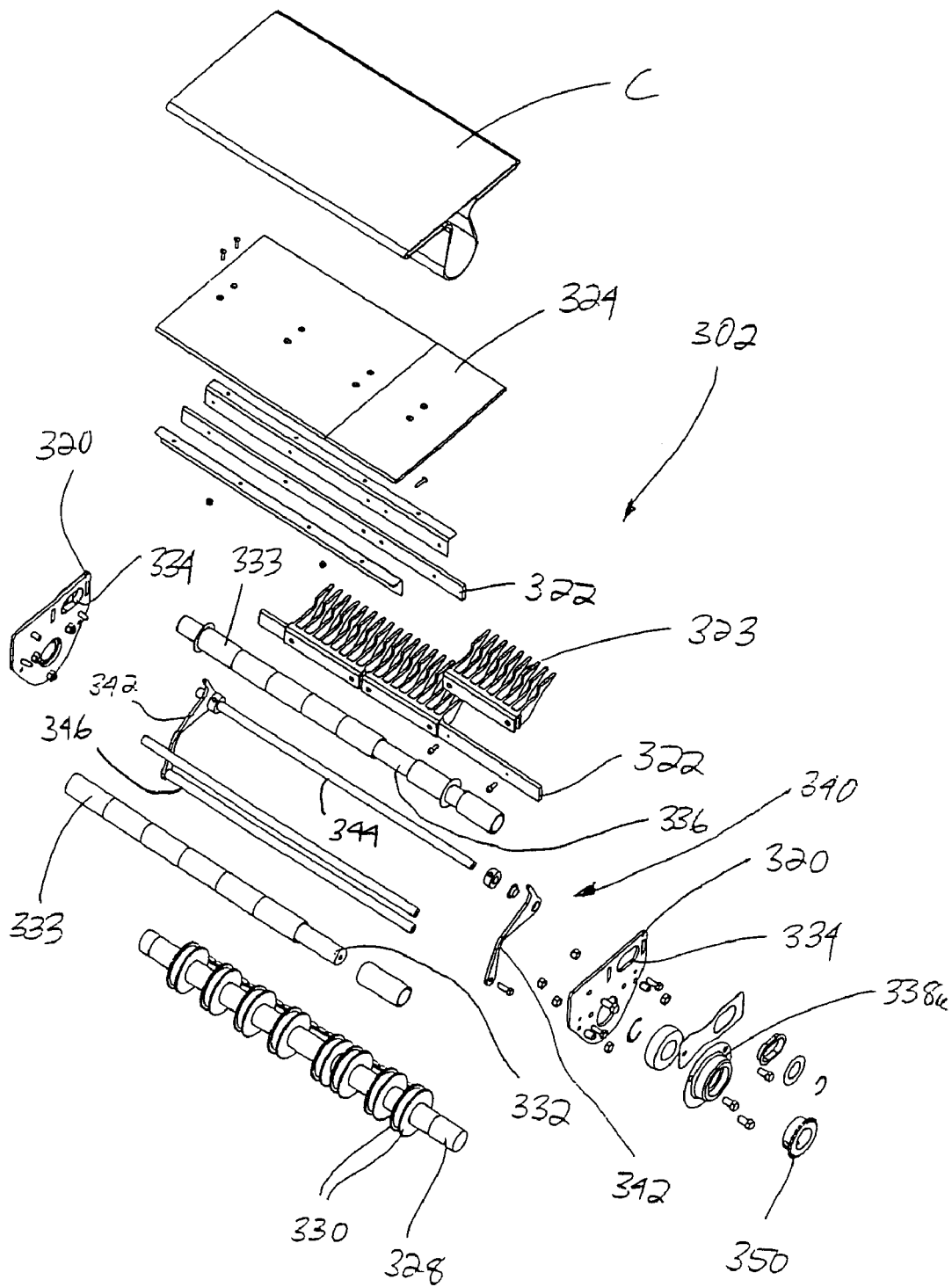
FIG. 19 is a partially exploded view of the bed subassembly of the conveyor of FIG. 18.
Figure 20:
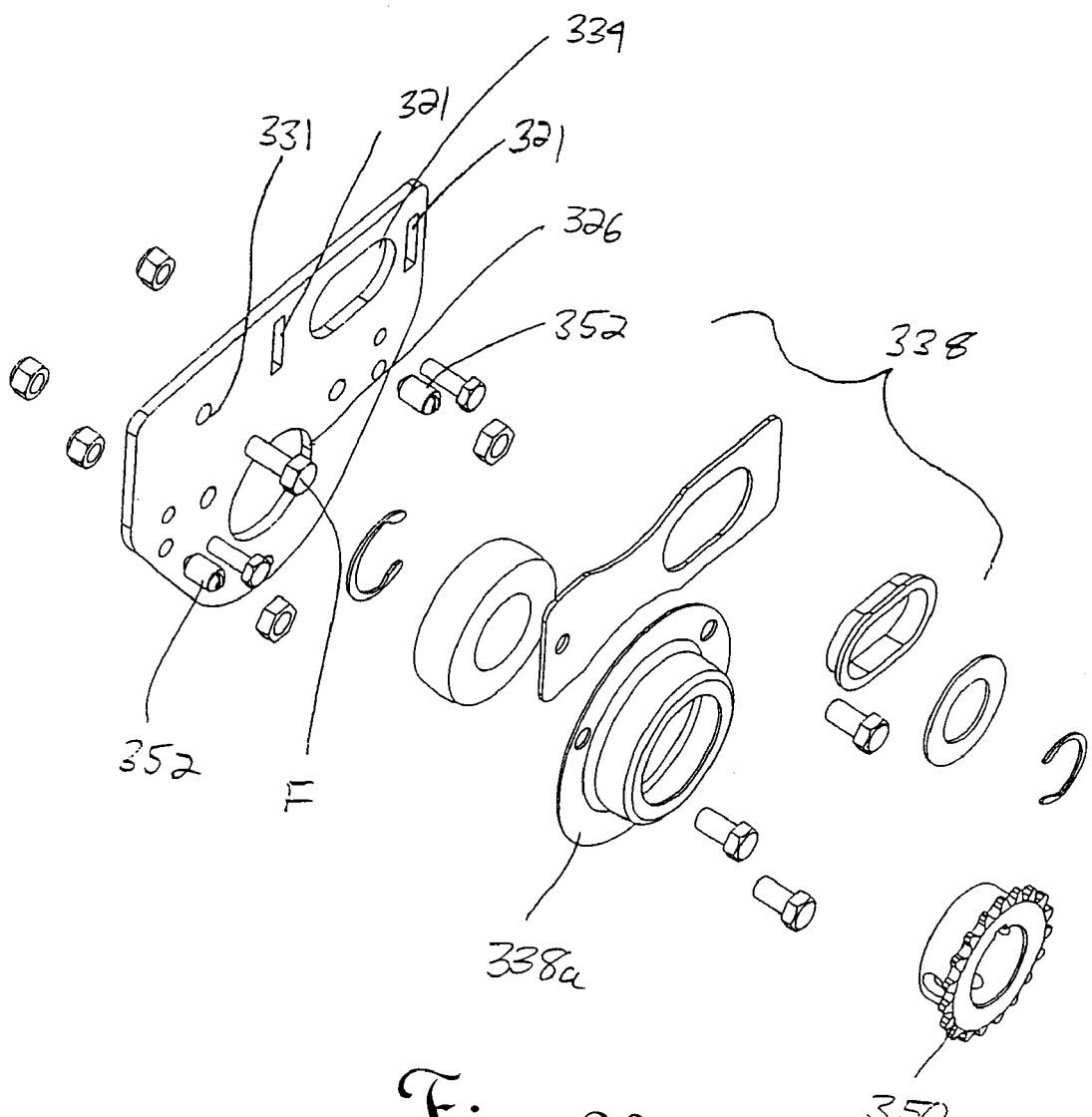
FIG. 20 is an enlarged exploded view of one side of the bed subassembly.

Turning to the bed subassembly 302 and the partially exploded view of FIG. 19, it generally includes a frame or body defined by a pair of spaced side frame members 320 or plates. The side frame members 320 as shown include openings in the form of slots 321 for receiving support rails 322 for supporting the bed 324, which in turn supports and guides the conveyor chain C (which may be constructed similar to as is described elsewhere herein) and for supporting a transfer comb 323 or like structure (unitary or otherwise). Each side frame member 320 also includes an opening 326 through which the ends of a driven structure, such as a drive shaft 328 carrying a plurality of sprockets 330 for engaging the chain C, may pass (see FIG. 20).

The frame members 320 also include openings 331 for receiving the stub shafts (which may be the ends of threaded fasteners F) that support a first idler structure, which is shown in the form of a shaft 332. As described above, this idler shaft 332 may be fixed against rotation and provide support a plurality of tubular bearings or rollers 333 that make rolling contact with the outside surface of the chain C as it traverses along the endless path (which as indicated is preferably T-shaped).

The side frame members 320 also include elongated slots 334 for receiving the ends of a second idler structure or shaft 336 (which may also be fixedly mounted and carry tubular bearings or rollers 333 for engaging the chain C). As with the embodiment described above, this arrangement allows this second idler shaft 336 to move toward and away from the adjacent outer surface of the chain C and provide a tensioning function. Suitable bushings and bearings (collectively labeled with reference numeral 338 in FIG. 20) may also be provided for the drive shaft 328 and the second idler shaft 226, as necessary or desired to reduce wear and increase the service life of the conveyor 300.

To urge the "floating" idler structure or shaft 336 toward the chain C in this third embodiment, a tensioner 340 is provided. As shown in the exploded view of FIG. 21 and the side view of FIG. 22, the tensioner 340 includes a pair of spaced arms 342 connected by a first cross member 344 (not shown in FIG. 21, but see FIG. 19) and a second cross member 346 oriented generally parallel to the first cross member. The arms 342 are carried and pivotally supported by the first cross member 344 (which may include suitable bushings 345 and locking collars 347 for establishing a secure connection; see FIG. 21), which is in turn supported by the side frame members 320 of the bed subassembly 302. At one end, each arm 342 includes a projection or finger 348 for adapted for engaging a corresponding portion (end) of the second idler structure or shaft 336. The second cross-member 346 is attached to the opposite end of the arms 342 using suitable fasteners F. Each arm 342 includes an optional elbow 349 or bend that allows it to fit within the confined space provided while maintaining the desirable large moment arm to maintain the appropriate amount of tension.

Figures 21, 22:
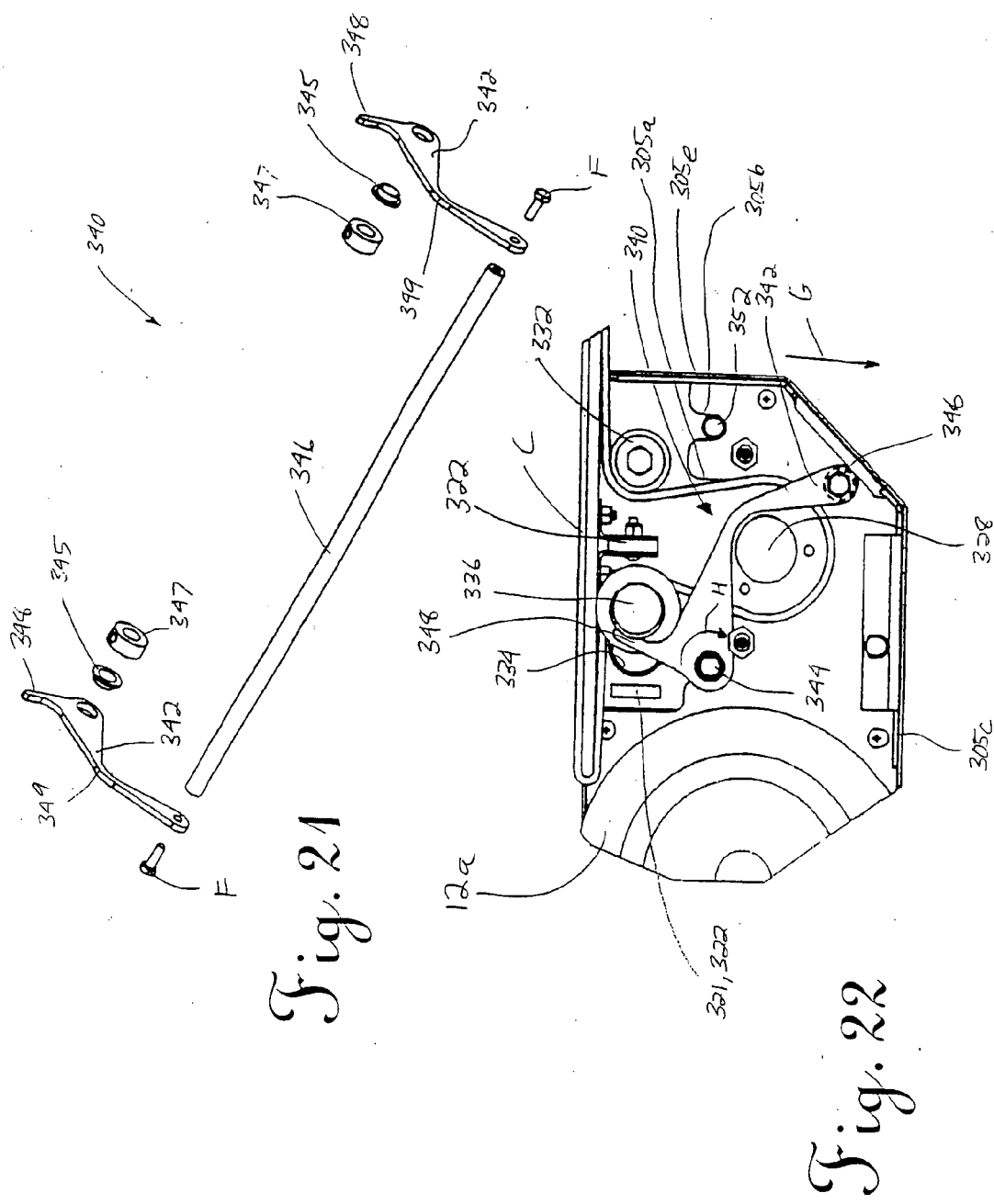
FIG. 21 is an exploded view of a tensioner forming part of the bed subassembly in the embodiment of FIG. 20.
FIG. 22 is a partially cross-sectional side view of the conveyor of FIG. 20 used in a transfer arrangement.

As perhaps best understood with reference to FIG. 22, the second cross member 346 functions as a weight (note the direction of gravity G) and causes the arms 342 to pivot about the first cross-member 344 (note action arrow H). As a result, the projection or finger 348 is urged against the adjacent second idler structure or shaft 336. This in turn urges this idler structure or shaft 336 (which is free to move or float within the slot 334 and any bushing or bearing present) against the adjacent outer surface of the conveyor chain C. Consequently, the appropriate amount of force is provided to properly tension the chain C in the conveyor 300. Moreover, the urging force applied may be easily adjusted by changing the size or composition of the second cross-member 346.

As the width of the conveyor 300 increases, the width of the second cross-member 346 increases. This, in turn, increases the weight of this member 346. The result is a desirable increase in the urging force in response to the increased tension force created by the wider chain C.

In operation, the bed subassembly 302 constructed as described above and as shown in FIG. 19 is positioned such that the bushings 338a for the drive shaft 328 rest in the U-shaped cutouts 305a. In the slave drive situation, a suitable sprocket or gear 350 is secured to the exposed end of the shaft 328 and operatively connected to the corresponding sprocket 312 of the adjacent conveyor section 12. However, it is also entirely possible to use a direct drive arrangement with a separate motor, or a gear train as outlined in the description that follows. In either case, the sprockets 330 thus engage the chain C and drive it along the endless path defined while the tensioner 340 supplies the appropriate amount of resistance to the "floating" idler shaft 336, independent of the movement of the support members 320.

To reduce the amount of rocking movement experienced by the bed subassembly 302 as the chain C is driven, structures may be provided for engaging the notches 305b. In the illustrated embodiment, these structures are in the form of detents 352 carried by the side frame members 320 and slidably received in the notches 305b. As should be appreciated, even with these anti-rocking or seating structures, the bed subassembly 302 may still be freely raised and lowered relative to the base subassembly 304 when the shaft 338 is disconnected from a motive device or related structure (e.g., the chain forming part of the slave drive or a direct drive/motor). This makes the bed subassembly 302 fully releasable in the event of a jam or when service is required, with the chain C remaining intact (i.e., non-slackened) if desired.

Figure 24:
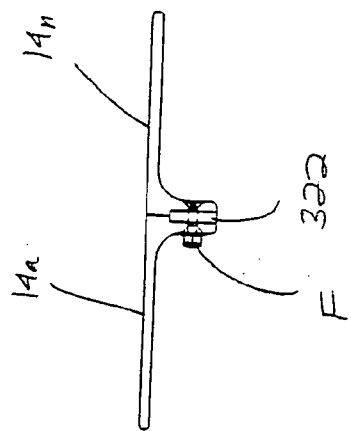
FIG. 24 is a side view of the assembled bed subassembly.
Figure 23:
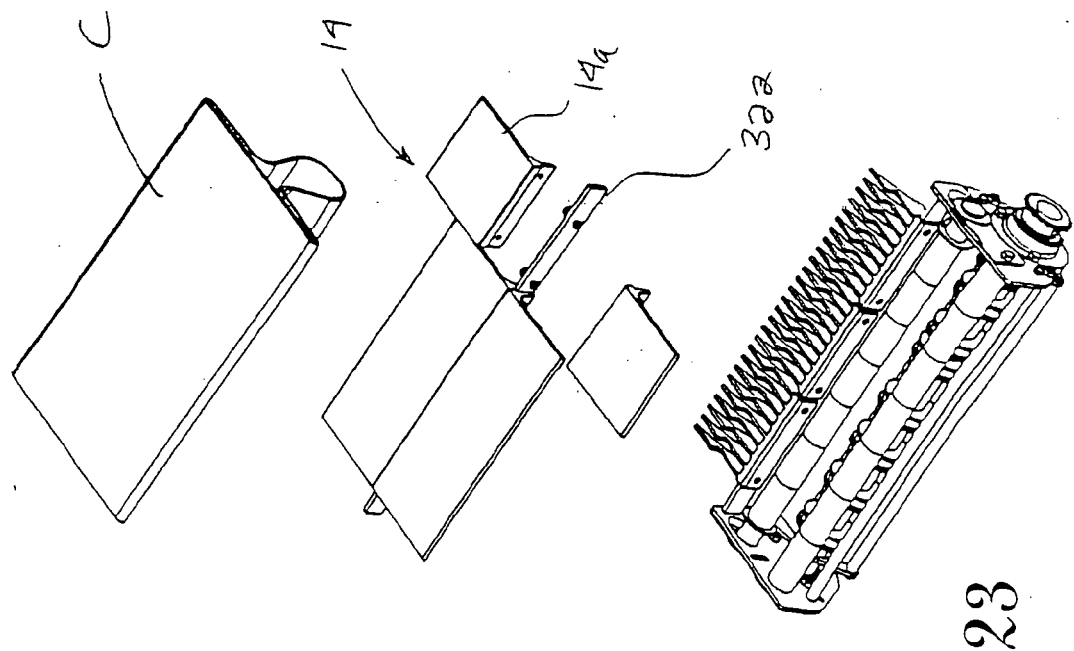
FIG. 23 is a partially exploded view of the bed subassembly of FIG. 20.

FIGS. 23 and 24 illustrate the manner in which the bed 14 may be formed in two or more generally L-shaped sections 14a . . . 14n. These sections may be mated together over the support 322 and held together using fasteners F. As noted above, the sections 14a . . . 14n may be aluminum extrusions, which are both lightweight and durable.

Figure 25:
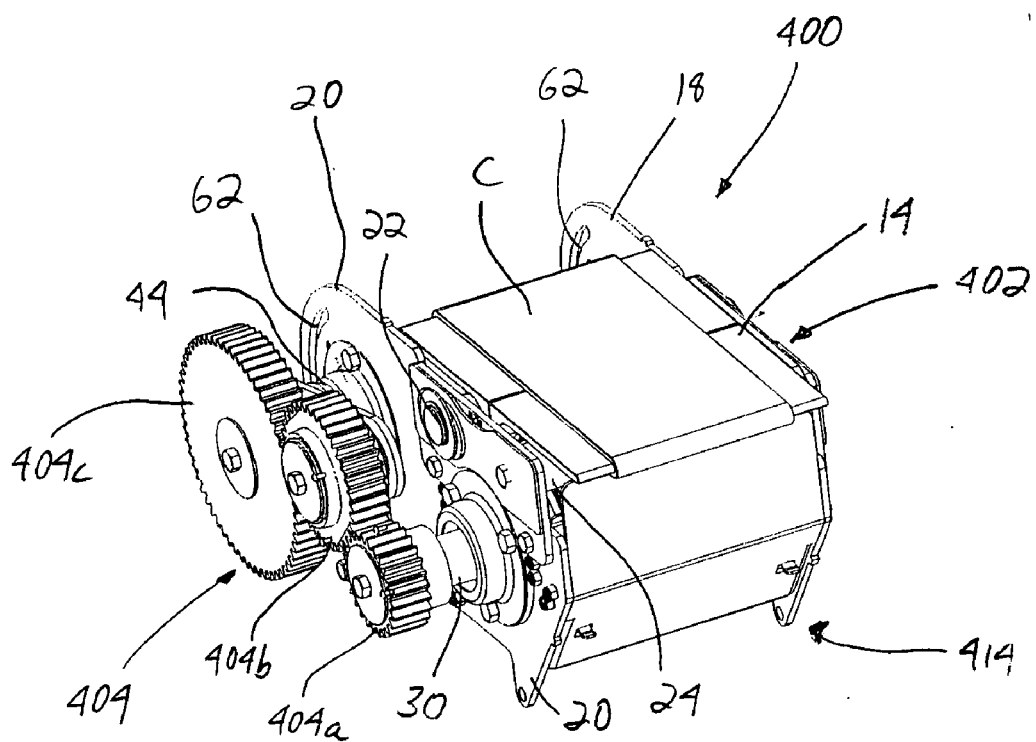
FIG. 25 is a perspective view of another embodiment of a slave-driven transfer assembly including gears.
Figure 26:
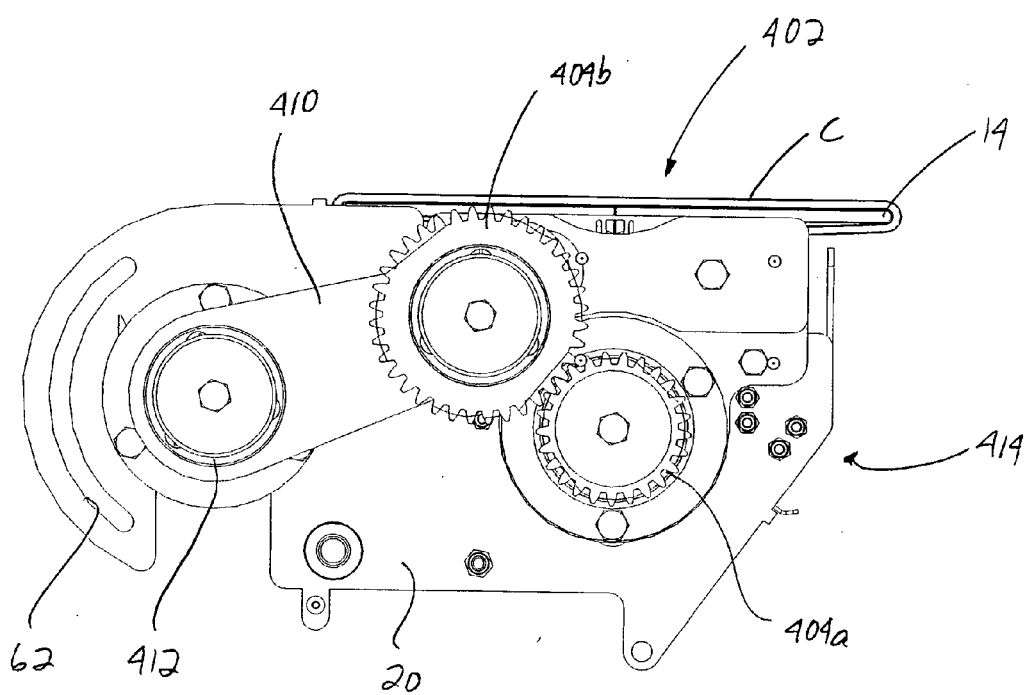
FIG. 26 is a side view of the transfer of FIG. 25.
Figure 27:
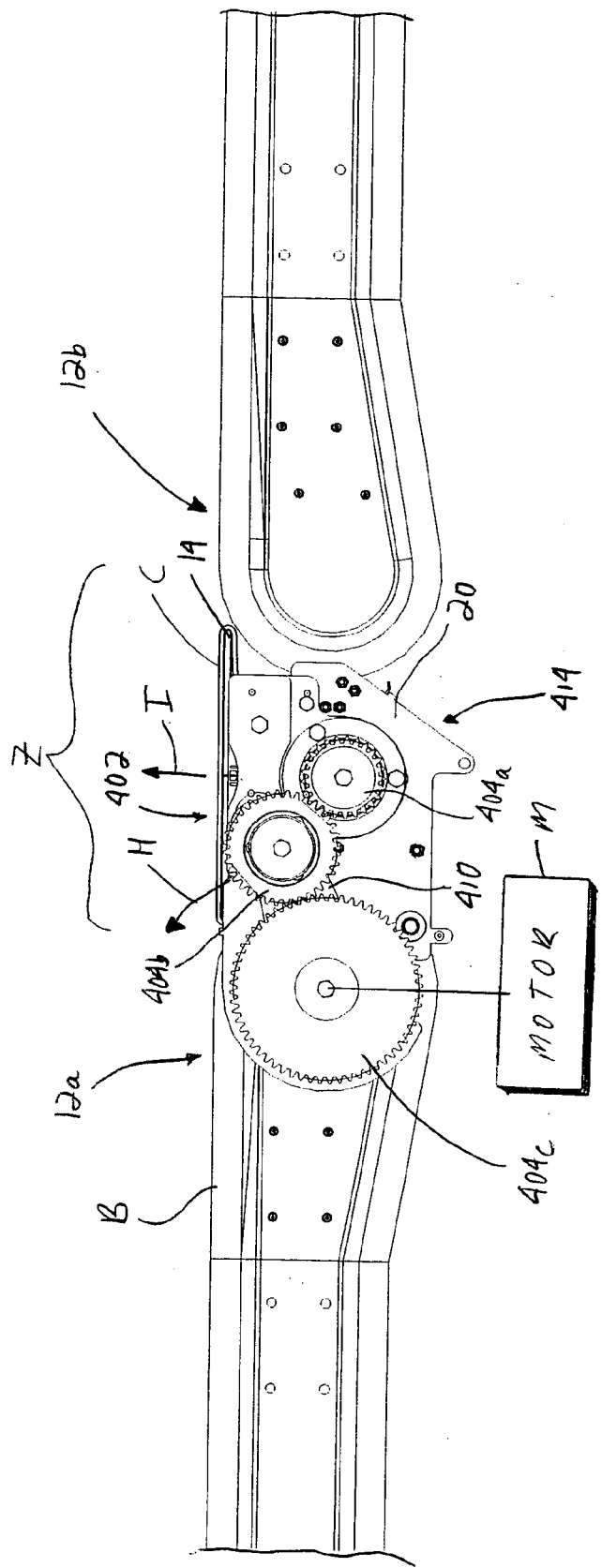
FIG. 27 is a side view of the transfer of FIG. 25 positioned in the gap between the ends of two adjacent conveyors.

Turning now to FIGS. 25-27, yet another embodiment of a transfer conveyor 400 for positioning in the gap or "zone" Z formed between the outfeed end of a first conveyor 12a and the infeed end of a second, adjacent conveyor 12b is disclosed. In terms of the bed subassembly 402 and tensioning arrangement, this conveyor 400 may be similar or identical to any of those previously described. However, rather than including a direct drive or a drive chain, this conveyor 400 includes a slave drive 404 having a plurality of gears forming a train. In particular, the slave drive 404 includes a first gear 404a associated with the drive shaft 30 for driving the belt or chain along the conveyor 400 (by friction, sprockets, or otherwise), a third gear 404c associated with the drive shaft of the infeed or outfeed end of an adjacent conveyor 12a (see FIG. 27), and a second or intermediate gear 404b for transmitting rotational motion of the third gear 404c to the first gear 404a for driving the associated belt or chain C.

As perhaps best shown in FIG. 26, in which the third gear 404c is not shown, the intermediate gear 404b is rotatably mounted to one end of an arm 410. The arm 410 is in turn supported by an extension of the drive shaft 44 of the adjacent conveyor 12a, such as by a bearing or bushing 412, such that it may rotate to at least a limited extent. The mounting of the intermediate gear 404b is such that the teeth are intermeshed with the teeth of the third gear 404c during rotation of the arm 410 about the axis defined by the drive shaft 44 of the adjacent conveyor 12a at all times. This includes when the intermediate gear 404b is positioned to intermesh with the teeth of the first gear 404a for driving the belt or chain C of the transfer conveyor 400.

As a result of this three gear "train," driving of the adjacent conveyor 12a, such as using motor M, serves to drive the chain C of the transfer conveyor 400 in the same direction as the adjacent belt B. Of course, such an arrangement avoids the need for any form of direct drive or motor dedicated to the transfer conveyor 400. This allows the transfer conveyor 400 to be less expensive to manufacture, lighter, and more compact for fitting in the gap between the adjacent conveyors 12a, 12b.

Similar to the transfer conveyor 300 shown in the fourth embodiment, this transfer conveyor 400 may include a frame subassembly 414 mounted to one end of the adjacent conveyor 12a, as described above, or may be freestanding. The frame assembly 414 may further comprise side frame members 18, 20, each including an arcuate slot 62, the U-shaped cutouts (not shown) and the notches (not shown) for associating with detents (not shown) on the bed subassembly 402. As a result, the bed subassembly 402 may rest freely by gravity on the frame members 18, 20, and then be bodily lifted apart from it by simply moving the intermediate gear 404b about the axis defined by the drive shaft 44 of the adjacent conveyor 12a a predetermined extent (e.g., about 20°). More specifically, once the intermediate gear 404b is moved clear of the first gear 404a (note action arrow H in FIG. 27), the bed subassembly 14 including the non-slackened belt or chain C, the idlers 22, 24, and the drive shaft 30, may together be bodily lifted as a unit from the mounted position (note action arrow I). Such a simplified sequence of events for removing the bed subassembly 402 (and then replacing it in a similar fashion) allows for easy clearing of any article jams, as well as for making any repairs or performing periodic cleaning operations.

In terms of materials, it is preferred to make the first and third gears 404a, 404c out of metal. However, the intermediate gear 404b is preferably formed out of a lubricious material, such as a nylon resin. The use of such a lubricious intermediate gear 404b may allow for the conveyor 400 to run at speeds of up to 150 feet per minute without the need for lubrication. Although not required, gears 404a, 404b, 404c formed of such materials may be desirable not only in terms of reducing maintenance costs, but also in situations where lubrication might be considered a contaminant.

The foregoing descriptions of various embodiments of the invention are provided for purposes of illustration, and are not intended to be exhaustive or limiting. Modifications or variations are also possible in light of the above teachings. For example, despite the focus on transfer conveyors, the inventions described above (and in particular the fourth embodiment shown in FIGS. 19-24) could easily be adapted for use as full-length driven conveyors for use either in a stand-alone environment or as part of a conveying system. This could be done by simply making the bed 14 and chain C the desired length, and then ensuring that the drive arrangement used is suitable for moving the chain at the desired speed. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A conveyor for positioning in the gap between one end of a first conveyor having a drive unit and an adjacent end of a second conveyor, comprising:
   an endless conveyor belt formed of a plurality of interconnected links;
   a frame releasably supporting a bed;
   a driver for contacting and driving the belt along the bed; and
   wherein the driver, belt, and bed are interconnected for being released together as a unit apart from the frame.

2. The conveyor according to claim 1, further including a first sprocket connected to a drive shaft projecting from the drive unit, a second sprocket connected to the driver, and an endless chain connecting the first and second sprockets.

3. The conveyor according to claim 1, further including a first gear connected to a drive shaft projecting from the drive unit, a second gear connected to the driver; and a third gear between the first and second gears.

4. The conveyor according to claim 3, wherein the third gear is supported by a rotatably mounted arm for allowing the third gear to rotate about the second gear while remaining intermeshed therewith.

5. The conveyor according to claim 4, wherein the bed, belt, and driver are resting on the frame by gravity and may be bodily lifted upon rotating the third gear about the second gear a predetermined extent.

6. The conveyor according to claim 1, further including a pair of idlers for supporting the conveyor belt and a tensioner for the conveyor belt.

7. The conveyor according to claim 1, wherein the driver frictionally engages the conveyor belt.

8. The conveyor according to claim 6, wherein the driver, idlers, belt, and bed are interconnected for being released together as a unit apart from the frame.

9. In a conveyor system for articles including a first conveyor, a second conveyor, and a frame positioned therebetween, the improvement comprising:
   a transfer conveyor for feeding articles along the system spanning between the conveyor portions, the transfer conveyor including a rodless conveyor belt comprised of a plurality of interlocking links and driven in an endless path and defining a conveying surface for moving the articles from the feeding portion to the receiving portion, the transfer conveyor freely resting by gravity on the frame and substantially fully releasable therefrom;
   whereby the transfer conveyor may be bodily lifted and released apart from the frame without the need for slacking the conveyor belt.

10. The transfer conveyor in a conveyor system of claim 9, wherein the frame comprises a base including a pair of U-shaped cutouts for receiving the ends of a driven shaft of the transfer conveyor.

11. The transfer conveyor in a conveyor system of claim 10, wherein the frame further comprises a pair of notches for receiving detents associated with the transfer assembly.

12. The transfer conveyor in a conveyor system of claim 9, further comprising:
   a pair of spaced side frame members;
   a drive structure supported by the side frame members;
   a bed supported by the side frame members;
   a pair of idler structures supported by the side frame members;
   a tensioner including a pair of spaced arms mounted for pivoting movement relative to the frame members, each including a finger at one end for engaging one of the idler structures and a weight at the opposite end for causing the arms to pivot such that the fingers urge that idler structure into engagement with the chain.

13. The transfer conveyor in a conveyor system of claim 9, further including a slave drive for transmitting rotational motion from a drive unit associated with the first or second conveyor to a drive structure for driving the belt or chain associated with the transfer assembly, whereby the need for a separate drive unit associated with the transfer conveyor is eliminated.

14. The transfer conveyor in a conveyor system of claim 9, further including a slave comprising a first gear connected to a drive shaft projecting from the first or second conveyor, a second gear connected to a driver for driving the belt or chain, and a third gear between the first and second gears.

15. The transfer conveyor in a conveyor system of claim 14, wherein the third gear is supported by an arm that allows the third gear to rotate about the second gear while intermeshed therewith.

16. The transfer conveyor in a conveyor system of claim 15, wherein the transfer conveyor may be bodily lifted upon rotating the third gear about the second gear a predetermined extent.

17. The conveyor according to claim 9, further including a drive for contacting and frictionally driving the conveyor belt.

18. A transfer conveyor for feeding articles from a first conveyor to a second conveyor, comprising:
   a frame supporting a bed;
   a rodless conveyor belt comprised of a plurality of interlocking links and forming a conveying surface for supporting the articles;
   a driver for contacting and frictionally driving the rodless conveyor belt along the bed;
   a pair of idlers for cooperating with the driver for contacting and guiding the belt; and
   a tensioner for tensioning the belt;
   wherein the bed, driver, and belt are interconnected for being released together as a unit apart from the frame.

19. The transfer conveyor according to claim 18, wherein the idlers and driver contact opposite surfaces of the belt.

20. A conveyor for positioning in the gap between one end of a first conveyor having a drive unit and an adjacent end of a second conveyor, comprising:
   an endless conveyor belt;
   a frame supporting a bed;
   a driver for driving the belt along the bed; and
   a slave drive for transmitting rotational motion from the drive unit to the driver for driving the belt, said slave drive comprising a first gear connected to a drive shaft projecting from the drive unit, a second gear connected to the driver, and a third gear between the first and second gears, wherein the third gear is supported by a rotatably mounted arm for allowing the third gear to rotate about the second gear while remaining intermeshed therewith.

* * * * *